United States Patent
Bachmaier et al.

(10) Patent No.: US 12,038,027 B2
(45) Date of Patent: Jul. 16, 2024

(54) ACTUATOR DEVICE AND METHOD FOR OPERATING AN ACTUATOR DEVICE OF THIS TYPE

(71) Applicant: METISMOTION GmbH, Munich (DE)

(72) Inventors: Georg Bachmaier, Munich (DE); Wolfgang Zoels, Munich (DE); Christopher Mcclanahan, Munich (DE); Patrick Froese, Munich (DE)

(73) Assignee: METISMOTION GmbH, Munich (DE)

(*) Notice: Subject to any disclaimer, the term of this patent is extended or adjusted under 35 U.S.C. 154(b) by 50 days.

(21) Appl. No.: 17/798,195

(22) PCT Filed: Feb. 14, 2020

(86) PCT No.: PCT/EP2020/053954
§ 371 (c)(1),
(2) Date: Aug. 8, 2022

(87) PCT Pub. No.: WO2021/160289
PCT Pub. Date: Aug. 19, 2021

(65) Prior Publication Data
US 2023/0059303 A1    Feb. 23, 2023

(51) Int. Cl.
*F15B 15/20* (2006.01)
*F15B 13/02* (2006.01)
*F15B 21/00* (2006.01)

(52) U.S. Cl.
CPC .............. *F15B 15/20* (2013.01); *F15B 13/02* (2013.01); *F15B 21/008* (2013.01); *F15B 2015/208* (2013.01)

(58) Field of Classification Search
CPC .. F15B 15/20; F15B 15/202; F15B 2015/206; F15B 2015/208
See application file for complete search history.

(56) References Cited

U.S. PATENT DOCUMENTS 5,638,676 A * 6/1997 Muller ...................... F15B 1/02
60/407
6,851,355 B2 * 2/2005 Harada ................. B29C 45/021
60/545
(Continued)

FOREIGN PATENT DOCUMENTS

DE        102009043034 A1     3/2011
EP             3490017 A1     5/2019
(Continued)

OTHER PUBLICATIONS

EPO; Application No. PCT/EP2020/053954; International Search Report and Written Opinion mailed Dec. 1, 2020.
(Continued)

*Primary Examiner* — Michael Leslie
(74) *Attorney, Agent, or Firm* — Fitch, Even, Tabin & Flannery, LLP

(57) ABSTRACT

The invention relates to an actuator device comprising at least one output element, which can be applied with a fluid and can thereby be moved into at least one retaining position. An actuator is provided which can be operated in a pumping operation by controlling the actuator, in which at least one part of the actuator can be alternatingly moved in a first direction and in a second direction opposite the first direction via the controlling of the actuator, whereby the fluid can be conveyed to the output element in order to apply the output element with the fluid. A discharge channel is also provided, via which the fluid can be discharged from the output element.

15 Claims, 11 Drawing Sheets

(56) References Cited

U.S. PATENT DOCUMENTS

| | | | | |
|---|---|---|---|---|
| 10,072,677 B2* | 9/2018 | Bachmaier | .............. | F04B 17/03 |
| 10,690,154 B2* | 6/2020 | Zöls | ....................... | F15B 11/022 |
| 10,851,808 B2* | 12/2020 | Bachmaier | ................ | F15B 7/08 |
| 11,274,526 B2* | 3/2022 | Deville | ................... | E21B 34/14 |
| 2019/0368515 A1 | 12/2019 | Bachmaier | | |

FOREIGN PATENT DOCUMENTS

| | | |
|---|---|---|
| EP | 3536976 A1 | 9/2019 |
| JP | H07119625 A | 5/1995 |
| JP | H0932721 A | 2/1997 |
| WO | 2015164226 A1 | 10/2015 |

OTHER PUBLICATIONS

Japanese Office Action from Japanese Application No. 2022-549036; mailed Sep. 25, 2023; with English Translation (30 pages).

* cited by examiner

ACTUATOR DEVICE AND METHOD FOR OPERATING AN ACTUATOR DEVICE OF THIS TYPE

CROSS-REFERENCE TO RELATED APPLICATIONS

This application is a U.S. national phase application of International Application No. PCT/EP2020/053954, filed Feb. 14, 2020, designating the United States.

FIELD

The invention relates to an actuator device as well as to a method for operating such an actuator device.

BACKGROUND

Actuator devices and methods for operating such actuator devices are already sufficiently known from the general prior art. Such an actuator device can include a drive element and an output element. By moving the drive element, a movement of the output element can for example be effected such that at least one further component provided in addition to the drive element and in addition to the output element can for example be moved by moving the output element. An, in particular fluidic and especially hydraulic, transmission can be provided between the drive element and the output element. By the transmission, it is possible that a first force is applied to the drive element for example for moving the drive element, wherein the output element provides a second force lower or greater with respect to the first force for moving the component as a result. Alternatively or additionally, it is conceivable that the output element moves faster or slower than the drive element if the drive element is moved for moving the output element. Hereby, the actuator device can be adequately used for different cases of application.

By moving the output element and by moving the component resulting therefrom, it is possible to move the output element and the component, respectively, from a first position into a second position different from the first position and in particular to retain them in the second position. In order to retain the output element and the component, respectively, in the second position, a retaining force is for example exerted on the output element or the output element exerts a retaining force on the component. Therein, it can be desirable to allow a fast movement of the component and the output element, respectively, from the second position into the first position or towards the first position. Hereto, it is desirable to terminate the exertion or provision of the retaining force as fast as possible, that is in short time.

Therefore, it is the object of the present invention to provide an actuator device and a method for operating such an actuator device such that at least one component can be particularly advantageously moved by means of the actuator device.

SUMMARY

This object is solved by an actuator device with the features of claim 1 as well as by a method with the features of claim 15. Advantageous configurations with convenient developments of the invention are specified in the remaining claims.

A first aspect of the invention relates to an actuator device, which comprises at least one output element. The output element can be supplied with a fluid, in particular with a gas or a liquid, in particular a liquid as incompressible as possible or at least substantially incompressible, and thereby is movable into at least one retaining position. In other words, the output element can for example be moved from an initial position into the retaining position different from the initial position, in particular in translational manner and/or in a direction of movement, by supplying the output element with the fluid. For example, the output element can be an output piston, which is for example translationally movably accommodated in an output housing, in particular in an output cylinder. By supplying the output piston with the fluid, the output piston can be moved, in particular in translational manner and/or in the direction of movement, in relation to the output cylinder, in particular from the initial position, into the retaining position. Hereto, the fluid is for example introduced into the output cylinder, in particular into an output chamber bounded in part by the output cylinder and in part by the output piston. Further, it is conceivable that the output element is a wall, in particular a bottom, of a corrugated bellows or spring bellows. For example, the fluid is introduced into the corrugated bellows, whereby the output element is moved, in particular in translational manner and/or in the direction of movement, in particular in relation to a further wall, in particular to a further sidewall, of the corrugated bellows. Hereby, the corrugated bellows is for example elongated.

In addition, the actuator device comprises at least one actuator, which is preferably electrically operable. The actuator is operable in a pumping operation by controlling the actuator. By controlling the actuator, in particular if the actuator is electrically operable, it can be understood that electrical energy, in particular electrical current or electrical voltage, is applied to the actuator. Hereby, it can in particular be understood that the actuator is supplied with the electrical energy or with the electrical voltage. For example, the actuator is a linear actuator. In particular, the actuator can be a solid-state actuator such as for example a piezo actuator. Further, it is conceivable that the actuator is formed as a different solid-state actuator such as for example a solenoid or polymer actuator. In the pumping operation, at least a part of the actuator is, in particular translationally, alternatingly movable in a first direction and in a second direction opposite to the first direction by controlling the actuator, whereby the fluid is conveyable to the output element, in particular conveyable into the output chamber, for supplying the output element with the fluid. The part of the actuator can for example be an armature also referred to as slider, which is for example reciprocated by controlling the actuator. If the actuator is for example a solid-state actuator, in particular a piezo actuator, thus, by controlling the actuator, it is for example effected that the actuator alternatingly extends or elongates and contracts or shortens in length. In extension or elongation of the actuator, at least the part of the actuator for example moves in the first direction, and in length-shortening of the actuator, at least the part of the actuator for example moves in the second direction.

In addition, the actuator device comprises at least one discharge channel, via which the fluid can be discharged from the output element, in particular after the output element has been supplied with the fluid. For example, the fluid can be discharged from the output chamber and thus be discharged from the output element by means of the discharge channel, in particular after the fluid has been introduced into the output chamber and thus after the output element has been supplied with the fluid. Hereto, the discharge channel is for example fluidically connected to the output chamber.

In addition, the actuator device comprises a valve device, which includes two valve elements, which are movable in relation to each other, whereby the valve device is shiftable or switchable between at least one closed state and at least one open state. In particular, the valve elements can for example be translationally moved in relation to each other to thereby shift or switch the valve device between the closed state and the open state. In the closed state, the discharge channel is, in particular fluidically, blocked by means of the valve device, such that fluid cannot flow through the discharge line in the closed state or such that fluid cannot be discharged or is discharged from the output chamber and from the output element, respectively, in particular by means of the discharge channel, in the closed state. Thus, the output element can be kept in the retaining position by the fluid in the closed state while blocking the discharge channel. In other words, if the fluid is for example pumped by means of the actuator, in particular into the output chamber, in the pumping operation, while the valve device is in its closed state, thus, the output element is hereby supplied with the fluid, while the valve device is in the closed state, and thereby the output element is, in particular successively, moved into the retaining position with progressive pumping of the fluid effected by means of the actuator. If the pumping is for example terminated thereupon, while the valve device is still in the closed state, thus, the output element is retained in the retaining position by means of the fluid located in the output chamber or supplying the output element, which has previously been pumped by means of the actuator, since the discharge channel is for example blocked by means of the valve device and thereby discharge of the fluid from the output chamber and from the output element, respectively, is prevented. Again stated in other words, the fluid, for example in that it is pumped by means of the actuator, such that the output element is supplied with the fluid, exerts a drive force on the output element, which is movable or moved into the retaining position by means of the output force, in particular against a counterforce, which for example acts on the output element and is opposite to the movement force. Since the discharge channel is therein closed by means of the valve device, the output element is retained in the retaining position against the counterforce by means of the fluid, after the pumping has been terminated and while the pumping remains undone. Again stated in other words, the counterforce does not result in the output element being moved from the retaining position back into the initial position or towards the initial position, and the counterforce does not result in the fluid flowing out of the output chamber or being discharged from the output element via the discharge channel.

However, in the open state, the valve device releases the discharge channel such that the discharge channel is released in the open state. Thus, the valve elements and thus the valve device allow discharge of the fluid from the output element and from the output chamber, respectively, via the discharge channel in the open state, whereby the valve elements allow a movement of the output element from the retaining position into at least one evasive position different from the retaining position in the open state. In the course of the movement of the output element from the retaining position into the evasive position, the output element for example moves into the initial position or towards the initial position such that the evasive position is for example the initial position or such that the evasive position is between the retaining position and the initial position.

Thus, if the pumping is for example terminated and the valve device is still retained in the closed state in particular during a period of time, thus, a movement of the output element remains undone during the period of time or the output element is in the retaining position during the period of time, in which the output element is retained by means of the fluid during the period of time. For example, if the valve device is shifted from the closed state into the open state after the period of time, thus, the counterforce for example results in the output element being moved from the retaining position into the evasive position since the fluid can be discharged from the output element via the discharge channel. For example, at least a part of the fluid first accommodated in the output chamber is moved, in particular pressed, out of the working chamber via the discharge channel by means of the output element moving from the retaining position into the evasive position.

By adjusting the closed state, thus, the output element can be moved into the retaining position and be retained in the retaining position. By adjusting the open state, a movement of the output element from the retaining position into the evasive position can be allowed since thereby the fluid can for example be discharged from the output chamber via the discharge channel and be discharged from the output element, respectively, and can no longer retain the output element in the retaining position against the counterforce.

Therein, the actuator device is formed such that by moving the part of the actuator in the first direction, a first one of the valve elements is, in particular translationally, movable in a first actuation direction, and thereby is movable towards the second valve element, whereby the valve device is shiftable, in particular from the open state, into the closed state. For example, the first actuation direction coincides with the first direction or the first actuation direction extends parallel to the first direction. Further, it is conceivable that the first actuation direction extends obliquely or perpendicularly to the first direction or the first actuation direction is opposite to the first direction.

For example, the part of the actuator is at least indirectly, in particular directly, and at least temporarily, in particular permanently, motion-coupled to the first valve element such that if the part of the actuator is moved in the first direction, the first valve element is moved in the first actuation direction. Further, it is conceivable that the part of the actuator is at least temporarily at least indirectly supported or capable of being supported on the first valve element in the first direction during its movement in the first direction, such that if the part is moved in the first direction, the first valve element is moved in the first actuation direction, in particular in the first direction. Hereby, the first valve element can be moved towards the second valve element for example starting from the open state, whereby the valve device is shiftable or shifted from the open state into the closed state. For example, the valve elements are spaced from each other in the open state such that the fluid can then for example flow through between the valve elements and such that the discharge channel, in which for example the valve device or the valve elements can be arranged, is then released, respectively. In the closed state, the valve elements for example, in particular directly, abut on each other such that the valve elements are sealed against each other and as a result block the discharge channel. In other words, fluid for example cannot flow through between the valve elements in the closed state, whereby the discharge channel is for example fluidically blocked by means of the valve elements in the closed state.

In addition, the actuator device is formed such that by moving the part in the second direction, a movement of the first valve element in a second actuation direction opposite to the first actuation direction away from the second valve element can be effected, whereby the valve device is shiftable, in particular from the closed state, into the open state. The second actuation direction for example coincides with the second direction or extends parallel to the second direction. Further, it is conceivable that the second actuation direction extends obliquely or perpendicularly to the second direction or is opposite to the second return device. In particular, the actuation directions extend parallel to each other and are opposite to each other. In other words, if the part of the actuator is moved in the second direction, thus, a movement of the second valve element in the second actuation direction is effected or allowed thereby, whereby the second valve element moves away from the first valve element. Hereby, the valve device is opened. By the feature that by moving the part of the actuator in the second direction, a or the movement of the first valve element in the second actuation direction away from the second valve element can be effected, it can in particular be understood that for example by moving the part in the second direction, a or the movement of the first valve element in the second actuation direction and away from the second valve element is allowed, or the movement of the first valve element in the second actuation direction away from the first valve element is actively effected, in particular such that the first valve element is movable together with the part, in particular in the first actuation direction and/or in the second actuation direction. In particular, an actuation device such as for example a spring can be provided, by means of which the first valve element is movable in the second direction of movement for example as a result of the movement of the part occurring in the second direction. For example, it is conceivable that the first valve element is, in particular rigidly, motion-coupled to the part of the actuator, such that for example if the part of the actuator is moved in the first direction or in the second direction with a first speed and/or by a first path, the first valve element is hereby moved along in the first actuation direction or in the second actuation direction with a second speed and/or by a second path, wherein the second speed corresponds to the first speed and/or wherein the second path corresponds to the first path.

The actuator device is formed to alternatingly move the part of the actuator in the first direction and in the second direction in the pumping operation such that in the pumping operation, after an in particular initial shift of the valve device into the closed state, the valve device remains in the closed state despite of the alternating movement of the first part in the first direction and in the second direction occurring in the pumping operation, whereby the fluid is conveyable or conveyed to the output element in the pumping operation. In other words, at least the part of the actuator is alternatingly moved in the first direction and in the second direction in the pumping operation such that in the pumping operation, after an initial shift of the valve device, in particular from the open state into the closed state, the valve device remains despite of the alternating movement of the first part occurring in the pumping operation, although for example—as previously described—the first valve element is motion-coupled to the part. Thus, although the first valve element for example alternatingly reciprocates in the first direction and in the second direction with the part of the actuator, the valve device remains closed or the valve elements for example remain abutting on each other, such that the discharge channel is and remains blocked and such that the fluid is conveyable to the output element and in particular into the output chamber in the pumping operation and in particular the output element is movable or moved, in particular from the initial position, into the retaining position in the pumping operation and by means of the pumping operation.

Therein, the actuator device is operable in an opening operation different from the pumping operation and for example following the pumping operation, in which opening operation a movement of the part of the actuator occurring in the second direction results in a movement of the first valve element proceeding in the second actuation direction and away from the second valve element and thereby in shifting the valve device from the closed state into the open state. In other words, the opening operation results in opening of the valve device and thus in the fact that the output element can for example evade the counterforce and can move or moves from the retaining position into the evasive position as a result. In particular, it is provided that a relative movement between the valve elements remains undone in the pumping operation such that the valve device remains closed in the pumping operation.

By means of the actuator device, on the one hand, it is possible to move the output element, in particular from the initial position, into the retaining position in the pumping operation, in particular via a transmission between the part and the output element for example capable of being effected or effected by the fluid. If the pumping or the pumping operation is then terminated, while the valve device remains closed, thus, the output element can be retained in the retaining position by means of the fluid. On the other hand, the actuator device allows particularly fast shift of the valve device from the closed state into the open state, in particular solely by corresponding control of the actuator or by varying the control of the actuator. Thus, if the actuator is for example controlled in a first manner, thus, the pumping operation is effected. If the actuator is then for example controlled in a second manner different from the first manner, thus, it is changed from the pumping operation into the opening operation and opening of the valve device can be particularly fast effected. Thus, if the valve device is for example first closed, such that the output element is first retained in the retaining position by means of the fluid, and if a situation then for example occurs, due to which a movement of the actuator from the retaining position into the evasive position is to be particularly fast effected, thus, a shift of the valve device from the closed state into the open state can be particularly fast effected. For example, the valve device is retained in the closed state such that an at least substantially constant, electrical voltage is applied to the actuator or that the actuator is at least substantially constantly or continuously supplied with an, in particular sufficiently high, electrical voltage. For example, the pumping operation is effected such that the actuator is controlled such that a first electrical voltage and a second electrical voltage lower with respect to the first electrical voltage, which can also be zero, are alternatingly applied to the actuator. If it is sufficiently fast alternated between the first voltage and the second voltage, thus, the pumping operation can be effected, while the valve device remains or is retained in the closed state. For example, if the electrical voltage, which is at least substantially continuously applied to the actuator for retaining the output element in the retaining position, is reduced without the actuator thereupon being again controlled such that the pumping operation is effected, thus, the valve device can thereby be particularly fast opened.

For example, in order to be able to particularly advantageously realize the pumping operation and the opening operation, in an advantageous configuration, the actuator device includes a damper device for example at least coupled to the first valve element, which damper device is preferably formed as a non-linear damper. By a non-linear damper, for example the following is to be understood: For example if a first actuation force is exerted on the damper, thus, the damper is thereby for example shortened in length or swaged or compressed. For example, if a second actuation force opposite to the first actuation force is exerted on the damper, thus, the damper is thereby for example extended, that is elongated or expanded. Thereby, the damper device is for example in particular a non-linear damper or the non-linear damper is in particular characterized in that for example if the first actuation force corresponds to the second actuation force in magnitude, the damper is shortened in length with a first speed and is expanded with a second speed different from the first speed. In other words, the actuation forces, although they are identical in magnitude, result in different speeds, with which the damper is shortened in length or expanded. Viewed the other way around, for example if the damper is to be expanded and shortened in length with the same speed, the second actuation force has to be different from the first actuation force and thus be greater or less than the first actuation force. It is apparent that the damper is loaded in tension, that is with a tensile force, in its expansion, wherein the damper is stressed in compression or with a compressive force in its shortening in length. Both in expanding and in shortening in length, the damper causes a damping, wherein the damping is referred to as tensile stage in expanding and the damping is referred to as compressive stage in shortening in length.

Since the damper is for example a non-linear damper, the tensile stage is harder or softer than the compressive stage. In other words, in expanding the damper, the damping is stronger or less strong than in shortening the damper in length. Again stated in other words, due to its non-linearity, the damper provides a first damping or a first damping effect in expanding the damper and a second damping or second damping effect different from the first damping in shortening the damper in length. Again stated in other words: If the non-linear damper is for example expanded with a first speed, thus, this results in a first damping force. If the damper is shortened in length, that is compressed, with a second speed, thus, this for example results in a second damping force. Since the damper now is non-linear, if the first speed corresponds to the second speed or vice versa, the first damping force is greater or less than the second damping force, in particular with regard to the sufficiently known formula:

$$F_d = dv$$

Therein, $F_d$ denotes the respective damping force, v the respective speed, with which the damper is expanded or compressed, and d a or the damping constant of the damper. Thus, the damper for example has a first damping constant for its tensile stage and a second damping constant different from the first damping constant for its compressive stage, which is for example greater or less than the first damping constant.

Upon an, in particular initial, first movement of the part of the actuator in the first direction provided for beginning the pumping operation, the damper device allows a movement of the first valve element in the first actuation direction towards the second valve element, whereby the damper device allows shifting the valve device from the open state into the closed state. Upon a following movement of the part in the second direction, the damper device prevents a movement of the first valve element in the second actuation direction away from the second valve element effecting a shift of the valve device into the open state, in particular at least temporarily, whereby the damper device retains the valve device in the closed state. Hereby, the part of the actuator is alternatingly movable in the first direction and in the second direction in the pumping operation, while the valve device remains in the closed state. By this embodiment, the valve device can be particularly simply opened and closed, that is switched between the open state and the closed state, in particular only by corresponding control of the actuator or by corresponding variation of the control of the actuator.

Therein, it has proven particularly advantageous if in that the damper device prevents a movement of the first valve element in the second actuation direction away from the second valve element effecting a shift of the valve device into the open state, in the pumping operation and thereby retains the valve device in the closed state, the part of the actuator and thereby the valve elements are, in particular commonly, alternatingly movable in the first actuation direction and in the second actuation direction, while the valve device remains in the closed state and preferably while a relative movement between the valve elements remains undone. In other words, the damper device, in particular in the form of a or the non-linear damper, and therein in particular with regard to the tensile stage is for example stiffer than with regard to the compressive stage, such that the damper device and the valve elements are for example reciprocated as a block with the part of the actuator in the pumping operation, without a relative movement between the valve elements being effected, that is without the valve device being shifted from the closed state into the open state.

A further embodiment is characterized in that the damper device is formed to allow a relative movement between the valve elements occurring along the first actuation direction and/or along the second actuation direction and effecting a shift of the valve device from the closed state into the open state in the opening operation. For example, if the electrical voltage, which is applied to the actuator to retain the output element in the retaining position, is sufficiently slowly reduced or reduced such that a control of the actuator effecting the pumping operation remains undone, thus, it is for example given sufficient time to the non-linear damper to decompress despite of its hard or stiff tensile stage and to effect a relative movement between the valve elements as a result, such that the valve elements are moved away from each other or such that the valve device is opened. This is for example effected in that control of the actuator or supply of the actuator with electrical energy, in particular with electrical voltage or current, remains undone or if this remains undone for a long time.

In a further, particularly advantageous embodiment of the invention, the actuator device comprises a stop, wherein the valve elements and the part of the actuator are movable along the first direction and along the second direction in relation to the stop. A particularly fast opening of the valve device can be effected in particularly simple manner with the aid of the stop.

A further embodiment is characterized in that the damper device comprises a first damper element movable together with the first valve element, in particular rigidly coupled to the valve element, and a second damper element, in particular translationally, movable in relation to the first damper element. In expanding and compressing the damper, the damper elements are, in particular translationally, moved for example in relation to each other, in particular such that one of the damper elements is moved into the other damper element or vice versa. Preferably, the damper elements are movable in relation to each other, in particular movable into each other, upon a movement of the first valve element in the first actuation direction towards the second valve element effected by moving the part of the actuator in the first direction, provided for shifting the valve device from the open state into the closed state and for beginning the pumping operation.

A further embodiment is characterized in that the damper elements are, in particular translationally, movable in the first direction and in the second direction in relation to the stop, wherein a movement of the second damper element in the second direction can be limited by means of the stop such that upon the movement of the first valve element in the first actuation direction towards the second valve element effected by moving the part of the actuator in the first direction and provided for shifting the valve device from the open state into the closed state and for beginning the pumping operation, the first damper element is, in particular translationally, movable in the first direction in relation to the second damper element, while a movement of the second damper element in the first direction remains undone. Hereby, the damper elements can be advantageously influenced with regard to their movement to be able to particularly simply and advantageously as well as fast switch between the pumping operation and the opening operation.

In a further, particularly advantageous embodiment of the invention, the actuator device comprises a return element, in particular at least indirectly, coupled to the damper elements, which can for example be formed as an in particular mechanical spring. By means of the return element, the damper elements are movable along the first direction and/or along the second direction in relation to each other, wherein a or the previously mentioned relative movement between the valve elements proceeding along the first actuation direction and/or the second actuation direction and effecting a or the shift of the valve device from the closed state into the open state can be effected by means of the return element.

Therein, it has proven particularly advantageous if the return element is, in particular rigidly and/or directly, coupled to the first damper element on the one hand and to the second damper element on the other hand.

In further configuration of the invention, it is provided that the damper elements bound two damper chambers in particular opposing each other, in which a damping medium, in particular a damping fluid, is respectively accommodated, which can be introduced into the damper chambers and can be passed out of the damper chambers. In particular, the damping fluid can flow over between the damper chambers and thus flow from one damper chamber into the other damper chamber and vice versa.

In order to be able to therein particularly advantageously switch between the opening operation and the pumping operation, it is provided in further configuration of the invention that the damper medium is the fluid.

A further embodiment is characterized by a drive element, which comprises a first drive part, a second drive part and a drive chamber bounded by the drive parts. The previous and following explanations to the output element can be readily also transferred to the drive element. Thus, the drive part can for example be a drive piston or a wall, in particular a bottom, of a corrugated bellows or spring bellows, wherein the second drive part can for example be a drive housing, in particular drive cylinder, or a further wall, in particular a sidewall, of the corrugated bellows or spring bellows. In the pumping operation, the first drive part is alternatingly movable or moved together with the second valve element in the first direction and in the second direction in relation to the second drive part, whereby the fluid is conveyable out of the drive chamber to the output element and is conveyable into the drive chamber.

A further embodiment is characterized by a return device, which can for example be formed as an in particular mechanical spring. By means of the return device, the first drive part and the second valve element are movable in the second direction in relation to the second drive part.

It has proven further particularly advantageous if the return device is coupled to a stop element, which is movable together with the first drive part and with the second valve element, wherein the stop element can be at least indirectly supported on the second damper element and on the return element in the second direction, in particular such that a movement of the second valve element and of the first drive part occurring in the second direction in relation to the second damper element and in relation to the return element can be limited or prevented by means of the stop element.

It has proven further particularly advantageous if the actuator device comprises a channel capable of being flown through by the damping medium and a check valve arranged in the channel, which allows a flow of the damping medium through the channel proceeding in a first flow direction and in into one of the damper chambers and blocks the channel for a flow of the damping medium occurring in a second flow direction opposite to the first flow direction and out of the one damper chamber.

A second aspect of the invention relates to a method for operating an actuator device, in particular the actuator device according to the first aspect of the invention. Advantages and advantageous configurations of the first aspect of the invention are to be regarded as advantages and advantageous configurations of the second aspect of the invention and vice versa. In the second aspect of the invention, the actuator device comprises at least one output element, which can be supplied with a fluid and is thereby movable into at least one retaining position.

In addition, the actuator device comprises an actuator, which is controlled and thereby operated in a pumping operation, in which at least a part of the actuator is alternatingly moved in a first direction and in a second direction opposite to the first direction by controlling the actuator, whereby the fluid is conveyed to the output element for supplying the output element with the fluid.

In addition, the actuator device comprises at least one discharge channel, via which the fluid can be discharged from the output element.

In addition, the actuator device comprises a valve device, which comprises two valve elements, which are movable in relation to each other, whereby the valve device is shiftable between at least one closed state blocking the discharge channel, in which the output element is to be retained in the retaining position by the fluid while blocking the discharge channel, and at least one open state releasing the discharge channel, in which the valve elements allow discharge of the fluid from the output element via the discharge channel and thereby a movement of the output element from the retaining position into at least one evasive position different from the retaining position.

By moving the part of the actuator in the first direction, a first one of the valve elements is movable in a first actuation direction and thereby movable towards the second valve element, whereby the valve device is shiftable into the closed state. By moving the part of the actuator in the second direction, a movement of the first valve element in a second actuation direction opposite to the first actuation direction away from the second valve element can be effected, whereby the valve device is shiftable into the open state. In the pumping operation, the actuator device alternatingly moves the part of the actuator in the first direction and in the second direction such that in the pumping operation, after an in particular initial shift of the valve device into the closed state, the valve device remains in the closed state despite of the alternating movement of the part of the actuator in the first direction and in the second direction occurring in the pumping operation, whereby the fluid is conveyed to the output element in the pumping operation. In addition, the actuator device is operated in an opening operation different from the pumping operation and following the pumping operation, in which opening operation a movement of the part of the actuator occurring in the second direction results in a movement of the first valve element proceeding in the second actuation direction and away from the second valve element and thereby in shifting the valve device from the closed state into the open state.

Further advantages, features and details of the invention are apparent from the following description of preferred embodiments as well as based on the drawing. The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

The drawing shows in.

In the FIGS., identical or functionally identical elements are provided with identical reference characters.

DESCRIPTION OF THE PREFERRED EMBODIMENTS

Figure 1:
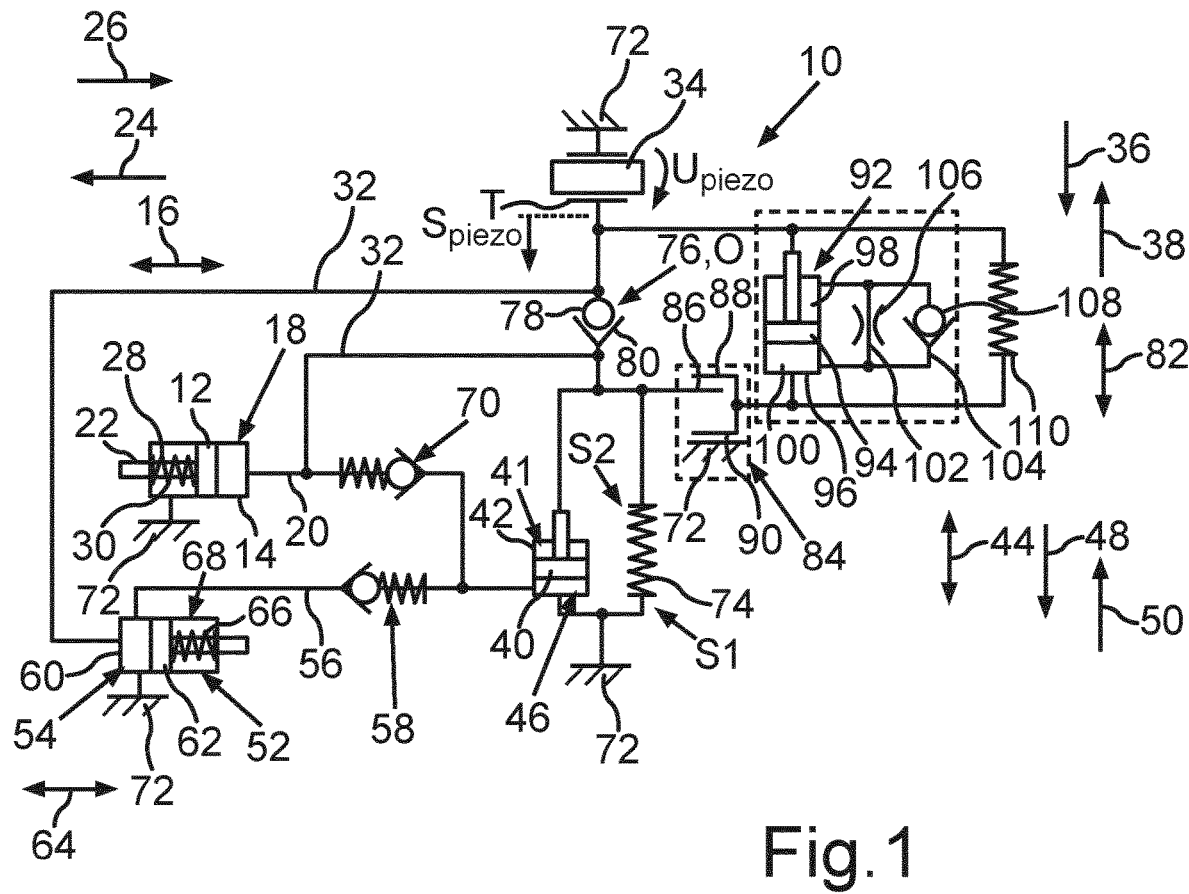
FIG. 1 a schematic representation of a first embodiment of an actuator device according to the invention, FIG. 2 partially a schematic representation of the actuator device according to FIG. 1.

FIG. 1 shows a first embodiment of an actuator device 10 in a schematic representation, which is formed as a hydraulic actuator, in particular as a piezo-hydraulic actuator. The actuator device 10 comprises an output element 12, which is formed as a first piston in the first embodiment. The first piston is also referred to as output piston. The output element 12 is translationally movably accommodated in a housing 14 for example formed as a cylinder, wherein the housing 14 is also referred to as output housing and thus can be formed as an output cylinder. The output element 12 for example formed as a piston or as a bottom of a spring or corrugated bellows is translationally movable in relation to the housing 14 along a direction of movement illustrated by a double arrow 16 in FIG. 1. Therein, the output element 12 and the housing 14 each partially bound an output chamber 18, wherein the output chamber 18 is directly bounded by the output element 12. Now, if a fluid for example formed as a gas or else as a liquid is introduced into the output chamber 18, in particular via a channel 20, thus, the output element 12 is thereby, in particular directly, supplied with the fluid introduced into the output chamber 18.

The output element 12 is connected to a piston rod 22 such that the piston rod 22 and the output element 12 are commonly translationally movable along the direction of movement in relation to the housing 14. For example, if the output element 12 is moved in a first output direction coinciding with the direction of movement or extending parallel to the direction of movement and illustrated by an arrow 24 in FIG. 1, thus, the piston rod 22 is thereby moved in the first output direction in relation to the housing 14 and at least partially moved out of the housing 14. If the output element 12 is, in particular translationally, moved in a second output direction illustrated by an arrow 26 in FIG. 1, opposite to the first output direction and coinciding with the direction of movement or extending parallel to the direction of movement, in relation to the housing 14, thus, the piston rod 22 is thereby, in particular translationally, moved in relation to the housing 14 in the second output direction in relation to the housing 14, wherein the piston rod 22 herein is at least partially moved into the housing 14.

Therein, the actuator device 10 comprises a spring element 28, which is presently formed as a mechanical spring. The spring element 28 is, at least indirectly, in particular directly, supported on the housing 14 on the one hand and at least indirectly, in particular directly, supported on the output element 12 on the other hand, in particular along the direction of movement. Therein, in the first embodiment, the spring element 28 is arranged in a spring chamber 30 opposing the output chamber 18, which is respectively partially bounded by the housing 14 and by the output element 12. If the output element 12 is moved in the first output direction, thus, the spring element 28 is thereby stressed. As a result, the spring element 28 provides a spring force also referred to as counterforce, by means of which the output element 12 is movable or moved in the second output direction, in particular if a flow of the fluid out of the output chamber 18 is allowed, in particular via a discharge channel 32.

The output element 12 is at least indirectly coupled, in particular motion-coupled, to a component not illustrated in the FIGS., in particular via the piston rod 22. For example, the component can be moved by moving the output element 12. By pumping or conveying the fluid into the output chamber 18, the output element 12 is, in particular directly, supplied with the fluid, which is pumped or conveyed into the output chamber 18. Hereby, the output element 12 is movable or moved from an initial position for example shown in FIG. 1 into a retaining position different from the initial position. For example, if after moving the output element 12 into the retaining position, further fluid is no longer conveyed into the output chamber 18 or if further conveying of fluid into the output chamber 18 remains undone after moving the output element 12 into the retaining position, and if discharge of the fluid accommodated in the output chamber 18 is prevented after moving the output element 12 into the retaining position, in particular in that the discharge channel 32 is blocked, thus, the output element 12 is retained in the retaining position by means of the fluid accommodated in the output chamber 18, in particular against the spring force or counterforce provided by the spring element 28. In the retaining position, the spring element 28 is for example stressed such that the spring element 28 provides the previously mentioned spring force or counterforce in the retaining position.

However, if the discharge channel 32 is then for example released such that at least a part of the fluid first accommodated in the output chamber 18 can flow out of the output chamber 18 via the discharge channel 32 and flow into the discharge channel 32, thus, the output element 12 can evade the spring force, whereby the output element 12 is movable or moved from the retaining position into an evasive position different from the retaining position by means of the spring force. For example, the evasive position is the initial position or the evasive position is arranged between the initial position and the retaining position, in particular along the direction of movement, such that for example if the discharge channel 32 is opened, the output element 12 is movable or moved from the retaining position into the initial position or towards the initial position and therein for example into the evasive position by means of the counterforce.

The actuator device 10 comprises an actuator 34, which can for example be formed as a solid-state actuator, in particular as a piezo actuator. The actuator 34 is, in particular electrically, controllable. In other words, the actuator 34 is electrically operable. By the electrical operation or the electrical control of the actuator 34, it is to be understood that the actuator 34 can be supplied or is supplied with an electrical voltage $U_{piezo}$. In other words, the electrical voltage is applied to the actuator 34 to thereby control the actuator 34. In particular, by controlling the actuator 34, it can be understood that the application of the electrical voltage to the actuator 34 is varied. Hereby, it can in particular be understood that the electrical voltage $U_{piezo}$ is varied between a first value and a second value. Preferably, the first value is a non-zero value, wherein the second value is preferably a value different from the first value. The second value can be a non-zero value or the second value is zero. By terminating the control of the actuator 34, it can in particular be understood that application of an electrical voltage to the actuator 34 remains undone, this means that supply of the actuator 34 with electrical energy or with electrical voltage remains undone.

By controlling the actuator 34, the actuator 34 is operable in a pumping operation, in which at least a part T of the actuator 34 is alternatingly, in particular translationally, movable in a first direction illustrated by an arrow 36 and in a second direction opposite to the first direction and illustrated by an arrow 38, by controlling the actuator 34, whereby the fluid is conveyable to the output element 12 and in particular conveyable into the output chamber 18 for supplying the output element 12 with the fluid. By applying the electrical voltage or an electrical voltage to the actuator 34, a length increase of the actuator 34 for example occurs, whereby the part T for example moves in the first direction, in particular by a path $s_{piezo}$. If the application of the electrical voltage to the actuator 34 is for example terminated or if the electrical voltage is reduced, thus, a length shortening of the actuator 34 thereby occurs such that at least the part T for example moves back in the second direction, in particular by the previously mentioned path. By moving the part T in the first direction, the fluid can be conveyed into the output chamber 18. In addition, the actuator device 10 comprises the discharge channel 32, via which the fluid first accommodated in the output chamber 18 can be at least partially discharged from the output chamber 18 and thus from the output element 12.

From FIG. 1, it is apparent that the actuator device 10 comprises a drive element 41 also referred to as conveying device in the first embodiment, which comprises a first drive part also referred to as conveying element 40 and a conveying housing 42 also referred to as second drive part. The conveying element 40 is translationally movable along a second direction of movement illustrated by an arrow 44 in FIG. 1 in relation to the conveying housing 42. In the first embodiment, the conveying element 40 is a piston, wherein the conveying housing 42 is a housing, in particular a cylinder. Further, it is conceivable that the output element 12 or the conveying element 40 is a first wall, in particular a bottom, of a corrugated bellows, wherein the housing 14 or the conveying housing 42 is then for example a second wall, in particular a sidewall of the corrugated bellows. For example, if the fluid is conveyed into the corrugated bellows, thus, the bottom is thereby for example translationally moved in relation to the sidewall, in particular in the first output direction. If the fluid is then for example discharged from the corrugated bellows, in particular from the output chamber 18, thus, a movement of the bottom in relation to the sidewall in the second output direction is thereby for example effected. The same can be transferred to the conveying element 40 and the conveying housing 42, in particular if the conveying element 40 is formed as the first wall and the conveying housing 42 is formed as the second wall of the corrugated bellows.

The conveying element 40 and the conveying housing 42 each partially bound a conveying chamber 46 also referred to as drive chamber, which is directly bounded by the conveying element 40. By moving the conveying element 40 in relation to the conveying housing 42, the conveying chamber 46 is varied in its volume. For example, if the conveying element 40 is, in particular translationally, moved in relation to the conveying housing 42 in a first conveying direction illustrated by an arrow 48 in FIG. 1 and coinciding with the second direction of movement or extending parallel to the second direction of movement, thus, the conveying chamber 46 is thereby reduced in its volume. For example, if the conveying element 40 is, in particular translationally, moved in a second conveying direction opposite to the first conveying direction, illustrated by an arrow 50 in FIG. 2 and coinciding with the second direction of movement or extending parallel to the second direction of movement, in relation to the conveying housing 42, thus, the conveying chamber 46 is thereby increased in its volume.

In addition, the actuator device 10 comprises a reservoir 52, which includes a reservoir chamber 54. Therein, the fluid or at least a part of the fluid is arranged in the reservoir chamber 54. If the conveying element 40 is, in particular translationally, moved in the second conveying direction in relation to the conveying housing 42, thus, at least a part of the fluid first accommodated in the reservoir chamber 54 and thus in the reservoir 52 is thereby sucked or conveyed out of the reservoir chamber 54 via a channel 56 also referred to as supply channel, sucked or conveyed through the channel 56 and sucked or conveyed into the conveying chamber 46. Therein, a check valve 58 is disposed in the channel 56, which blocks towards the reservoir chamber 54 and opens in opposite direction and thus towards the conveying chamber 46 also referred to as supply chamber. Thereby, it can be avoided by means of the check valve 58 that the fluid undesirably flows into the channel 56 towards the reservoir chamber 54 and thus for example out of the conveying chamber 46 into the reservoir chamber 54.

In the first embodiment, the reservoir 52 is formed as a fluid or hydraulic cylinder. Alternatively, it is conceivable that the reservoir 52 is formed as a spring or corrugated bellows. In the first embodiment, the reservoir 52 comprises a reservoir housing 60 and a reservoir piston 62, which each partially bound the reservoir chamber 54. The reservoir piston 62 is translationally movable in relation to the reservoir housing 60 along a reservoir direction illustrated by a double arrow 64 in FIG. 1. Therein, the reservoir 52 comprises a spring element 66, which is for example formed as a mechanical spring. For example, the spring element 66 is arranged in an accommodating chamber 68, which is for example opposing the reservoir chamber 54, in particular along the reservoir direction. Therein, the accommodating chamber 68 is for example respectively partially bounded by the reservoir piston 62 and the reservoir housing 60. The spring element 66 is at least indirectly, in particular directly, supported on the reservoir housing 60 on the one hand and at least indirectly, in particular directly, on the reservoir piston 62 on the other hand along the reservoir direction. If the spring element 66 is stressed, the spring element 66 exerts a spring force on the reservoir piston 62, whereby the fluid can for example be stored under pressure in the reservoir chamber 54. Thus, the reservoir 52 is for example a pressure storage, by means of which or in which the fluid can be stored under pressure.

If the fluid is discharged from the reservoir chamber 54, thus, the spring element 66 can for example at least partially relax and a volume decrease of the reservoir chamber 54 occurs. If the fluid is introduced into the reservoir chamber 54, thus, this results in a volume increase of the reservoir chamber 54 and thus in stressing of the spring element 66.

If the conveying element 40 is, in particular translationally, moved in the first conveying direction in relation to the conveying housing 42, thus, this results in a volume decrease of the conveying chamber 46 and at least a part of the fluid located in the conveying chamber 46 is conveyed out of the conveying chamber 46 by means of the conveying element 40. Since the check valve 58 avoids flow of the fluid from the conveying chamber 46 into the reservoir chamber 54, the fluid, which is conveyed out of the conveying chamber 46 by means of the conveying element 40, flows through the channel 20 and is guided and introduced into the output chamber 18 by means of the channel 20. Therein, a check valve 70 is arranged in the channel 20, which blocks towards the conveying chamber 46 and opens in opposite direction and thus towards the output chamber 18.

Overall, it is apparent that the channel 56 is for example fluidically connected to the conveying chamber 46 on the one hand and fluidically connected to the reservoir chamber 54 on the other hand. For example, the channel 20 is fluidically connected to the output chamber 18 on the one hand and to the conveying chamber 46 on the other hand. The check valve 70 prevents that if the conveying element 40 is moved in the second conveying direction, the fluid is conveyed, in particular sucked, out of the output chamber 18 via the channel 20, such that at least a part of the fluid is conveyed out of the reservoir chamber 54 and conveyed into the conveying chamber 46 in moving the conveying element 40 in the second conveying direction.

As is explained in more detail in the following, a or the movement of the conveying element 40 in the first conveying direction is effected by a movement of the part T of the actuator 34 occurring in the first direction, and a movement of the conveying element 40 in the second conveying direction is effected by a movement of the part T of the actuator 34 occurring in the second direction. The conveying housing 42 is for example fixed to a basic element 72, in particular at least along the conveying direction, such that relative movements between the conveying housing 42 and the basic element 72 are prevented or remain undone at least along the conveying direction. For example, the basic element is or functions as a stop, by means of which movements of other components of the actuator device, in particular in the first and/or second direction, can be at least limited or prevented. In particular, the basic element can be a housing, in which for example elements of the actuator device 10, in particular movable in relation to the housing, such as for example the conveying element 40 can be arranged.

Therein, a spring element 74 is provided, which is supported on the basic element 72 on the one hand and on the conveying element 40 on the other hand along the conveying direction. In other words, the spring element 74, which is preferably a mechanical spring, is for example in coupling with the basic element 72 and for example with the conveying housing 42 on the one hand and with the conveying element 40 on the other hand. In particular, a first location S1 of the spring element 74 is fixed to the basic element 72 and a second location S2 of the spring element 74 is coupled to the conveying element 40 and thus, in particular translationally, movable together with the conveying element 40 along the conveying direction in relation to the basic element 72 and in relation to the conveying housing 42. For example, the locations S1 and S2 are respective ends of the spring element 74. Thus, if the conveying element 40 is for example moved in relation to the conveying housing 42 in the first conveying direction, thus, the spring element 74 is stressed, in particular compressed. For example, if the conveying element 40 is moved in the second conveying direction in relation to the conveying housing 42 and in relation to the basic element 72, thus, the spring element 74 is thereby at least partially relaxed, in particular elongated. By stressing the spring element 74, it for example provides a spring force, by means of which the conveying element 40 is for example movable in the second conveying direction in relation to the conveying housing 42 and thus in relation to the basic element 72.

The actuator device 10 comprises a valve device 76, which includes two valve elements 78 and 80. The valve elements 78 and 80 are, in particular translationally, movable in relation to each other along a valve direction illustrated by a double arrow 82 in FIG. 1. In the first embodiment, the valve direction coincides with the first direction and with the second direction or extends parallel to the first direction and parallel to the second direction, which extends parallel to the first direction and is opposite to the first direction.

Figure 4:
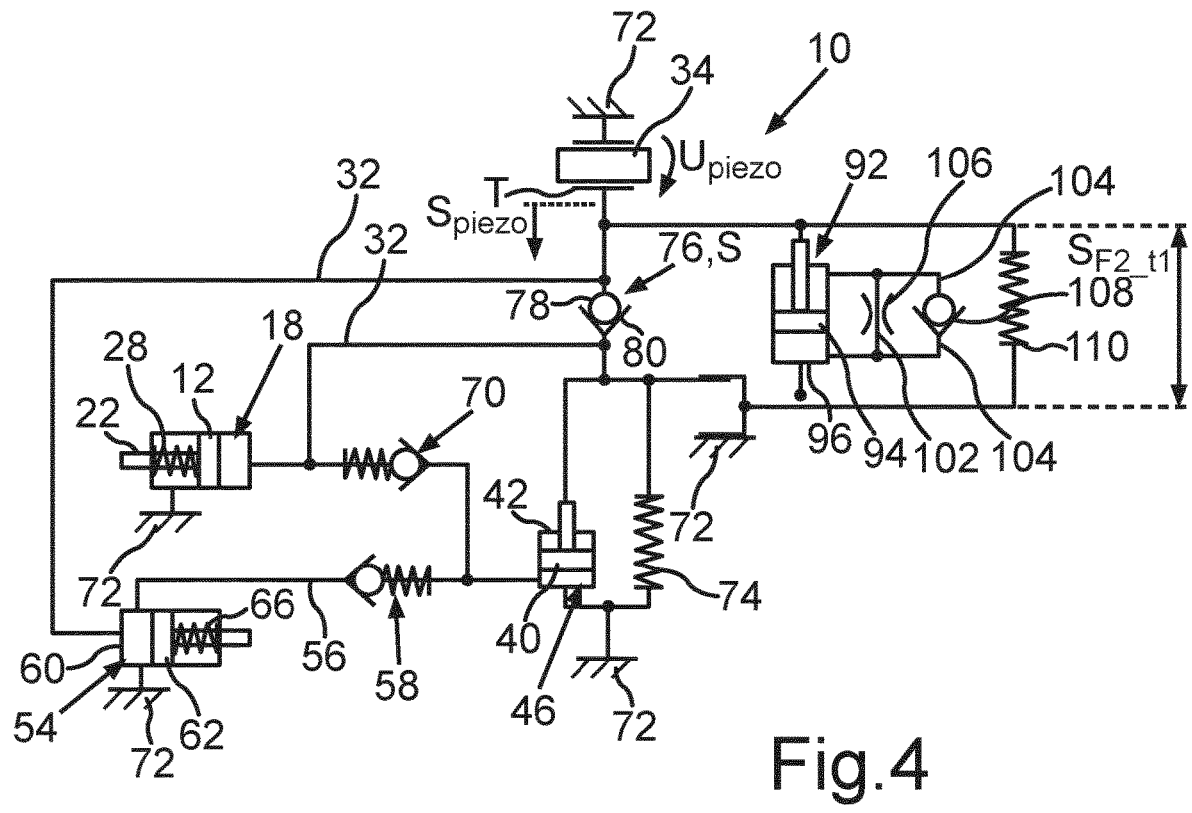
FIG. 4 a further schematic representation of the actuator device according to FIG. 1.

By moving the valve elements 78 and 80 in relation to each other, the valve device 76 is shiftable or switchable between an open state O shown in FIG. 1 and a closed state S for example shown in FIG. 4. In addition, it is apparent from FIG. 1 that the discharge channel 32 is fluidically connected to the output chamber 18, in particular via at least a part of the channel 20, on the one hand and fluidically connected to the reservoir chamber 54 on the other hand. Thus, if at least a part of the fluid first located in the output chamber 18 is discharged from the output chamber 18 via the discharge channel 32, such that the fluid discharged from the output chamber 18 flows through the discharge channel 32, thus, the fluid discharged from the output chamber 18 and thus from the output element 12 is passed from the output chamber 18 to the and in particular into the reservoir chamber 54 by means of the discharge channel 32. Therein, the valve device 76 is arranged in the discharge channel 32 such that the valve device 76 fluidically blocks the discharge channel 32 in the closed state S. Hereby, the output element 12—after it has been moved into the retaining position in the described manner—can be retained in the retaining position in particular against the counterforce. In other words, discharge of fluid from the output chamber 18 is prevented in the state S. However, the valve device 76 releases the discharge channel 32 in the open state O such that the discharge channel 32 is opened and capable of being flown through by at least a part of the fluid from the output chamber 18 in the open position O. In other words, the valve elements 78 and 80 and thus the valve device 76 allow discharge of the fluid from the output chamber 18 and thus from the output element 12 via the discharge channel 32 in the open state O, whereby the valve elements 78 and 80 and thus the valve device 76 allow the previously described movement of the output element 12 from the retaining position into the evasive position.

In addition, the output device 10 is formed such that by moving the part T of the actuator 34 in the first direction (arrow 36) for example starting from the open state O, the first valve element 78 is movable in a first actuation direction illustrated by the arrow 36 and thereby movable towards the second valve element 80, whereby the valve device 76 is shiftable from the open state O into the closed state S. In other words, the first direction coincides with the first actuation direction and vice versa, respectively, in the first embodiment. Thus, if the valve device 76 is for example first in the open state O, and if the part T is then moved in the first direction by corresponding control of the actuator 34, thus, the valve element 78 is thereby moved in the first direction in relation to the valve element 80 and therein moved towards the valve element 80, in particular such that the valve element 78 comes into contact with the valve element 80 and thus the valve device 76 is closed, that is transferred into the closed state S.

From FIG. 1, it is apparent that the valve element 80 for example forms a valve seat for the valve element 78 for example formed as a valve ball. In the open state O, the valve elements 78 and 80 are spaced from each other such that the valve element 78 is spaced from the valve seat and thus does not sit on the valve seat. However, the valve elements 78 and 80 at least indirectly, in particular directly, abut on each other in the closed state S, such that the valve element 78 then for example sits on its corresponding valve seat. In the first embodiment, the valve element 78 is for example, in particular rigidly, coupled to the part T such that if the part T is moved by a first path and/or with a first speed by corresponding control of the actuator 34, the valve element 78 is moved by a second path and/or with a second speed resulting therefrom, wherein the second path corresponds to the first path and the second speed corresponds to the first speed. Furthermore, it is provided that the second valve element 80 is, in particular rigidly, coupled or motion-coupled to the conveying element 40 such that the valve element 80 is for example movable together with the conveying element 40 along the conveying direction. Thus, the first direction for example coincides with the first conveying direction and the second direction coincides with the second conveying direction. In particular, the valve element 80 and the conveying element 40 are coupled, in particular motion-coupled, to each other such that for example if the conveying element 40 is moved by a third path and/or with a third speed, the valve element 80 is moved by a fourth path and/or with a fourth speed resulting therefrom, in particular together with the conveying element 40, wherein the third speed corresponds to the fourth speed and the third path corresponds to the fourth path. In addition, it is apparent from FIG. 1 that the reservoir housing 60 and the housing 14 are also fixed to the basic element 72. Therein, the part T is, in particular translationally, movable along the first direction and along the second direction in relation to the basic element 72. Further, it is apparent from FIG. 1 that the spring element 74, in particular the location S2, is, in particular rigidly, coupled to the valve element 80 such that the location S2, the conveying element 40 and the valve element 80 are for example commonly movable or moved with the same speed and by the same path, in particular if the conveying element 40 is for example moved. By moving the part T of the actuator 34 in the second direction, a movement of the first valve element 78 in a second actuation direction opposite to the first actuation direction and thus to the first direction away from the second valve element 80 can be effected, whereby the valve device 76 is shiftable from the closed state S into the open state O.

Thus, the second actuation direction coincides with the second direction. In other words, the actuator 34 is controlled such that the actuator 34 shortens in length such that the part T moves in the second direction in relation to the basic element 72, thus, a movement of the valve element 78 in relation to the valve element 80 in the second direction and thus away from the valve element 80 for example can thereby be effected, whereby the valve device 76 can be opened for example starting from the closed state S, that is transferred from its closed state S into the open state O.

Now, the actuator device 10 is formed to alternatingly move the part T of the actuator 34 in the first direction (arrow 36) and in the second direction (arrow 38) in the pumping operation such that in the pumping operation, after initially shifting the valve device 76 into the closed state S, the valve device 76 remains in the closed state S despite of the alternating movement of the part T in the first direction and in the second direction occurring in the pumping operation, whereby the fluid is conveyable or conveyed into the output chamber 18 and thus to the output element 12 in the pumping operation. In other words, the part T, the valve elements 78 and 80 and the conveying element 40 commonly or simultaneously move alternatingly in the first direction and in the second direction in relation to the basic element 72 and thus in relation to the conveying housing 42 in the pumping operation, while the valve device 76 is in the closed state S and remains in the closed state S and in particular while relative movements between the valve elements 78 and 80 remain undone, such that the fluid is alternatingly conveyed from the reservoir chamber 54 via the channel 56 into the conveying chamber 46 and thereupon conveyed out of the conveying chamber 46 and thereby conveyed from the conveying chamber 46 via the channel 20 into the output chamber 18 and thus conveyed to the output element 12. And discharge of the fluid from the output chamber 18 via the discharge channel 32 remains undone (since the valve device 76 in the discharge channel 32 is closed). In particular, it is apparent from FIG. 1 that the valve device 76 is arranged in the discharge channel 32 and therein between the output chamber 18 and the reservoir chamber 54 in flow direction of the fluid flowing for example from the output chamber 18 through the discharge channel 32 into the reservoir chamber 54.

In addition, the actuator device 10 is operable in an opening operation different from the pumping operation and for example following the pumping operation. In the opening operation or for realizing the opening operation, the actuator 34 is for example controlled such that a movement of the part T of the actuator 34 occurring in the second direction and in relation to the basic element 72 is effected and results in a movement of the first valve element 78 proceeding in the second direction and away from the second valve element 80 and thereby in shifting the valve device 76 from the closed state S into the open state O. Thus, the valve device 76 is opened in the or by the pumping operation, whereby the fluid is for example drained from the output chamber 18 and the output element 12 can evade the counterforce as a result.

Figure 2:
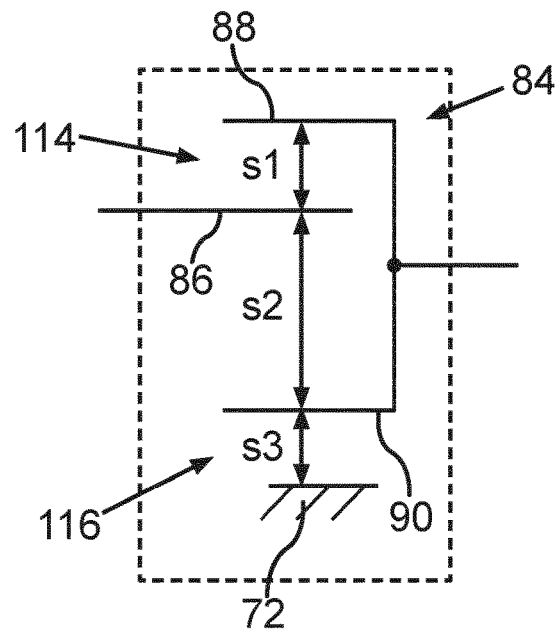

For example, the actuator device 10 is operable in a retaining operation, in which conveying fluid into the output chamber 18 remains undone and the valve device 76 is closed, whereby the output element 12 is retained in the retaining position by means of the fluid accommodated in the output chamber 18 in the retaining operation. In particular, the actuator 34 is at least substantially continuously supplied with an in particular at least substantially constant electrical voltage in the retaining operation, whereby the valve device 76 is kept closed in the retaining operation, in particular by means of the actuator 34 via the part T thereof and by energizing the actuator 34, respectively. Therein, the actuator device 10 in particular allows to particularly fast, that is in particularly short time, switch from the retaining operation into the opening operation also referred to as release operation, such that the valve device 76 can be particularly fast opened and the output element 12 can particularly fast evade the counterforce as a result. Hereto, the electrical voltage, which is applied to the actuator 34, is for example reduced to zero. Thereby, retaining of the previously mentioned component realized in the retaining operation and by means of the output element 12 can for example be cancelled such that the component can for example evade a corresponding force. In the first embodiment, the actuator device 10 comprises a stop unit 84, which is also referred to as hard stop unit and is illustrated in FIG. 2 in enlarged manner. The stop unit 84 comprises a first stop 86, which is movable together with the conveying element 40, with the location S2 and in particular with the valve element 80, in particular in the first direction and in the second direction, in particular in direct manner, that is preferably without a transmission. Thus, if the valve element 80 is for example moved in the first or second direction in relation to the basic element 72 with a fifth speed and/or by a fifth path, thus, the stop 86 is thereby for example moved in the first or second direction in relation to the basic element 72 with a sixth speed and/or by a sixth path or moved together with the valve element 80, wherein the fifth speed corresponds to the sixth speed and/or the fifth path corresponds to the sixth path. In addition, the stop unit 84 comprises a second stop 88 and a third stop 90, which are—as also the stop 86—in particular translationally, movable in the first direction and in the second direction in relation to the basic element 72. The stops 86, 88 and 90 are also referred to as stop elements.

In addition, the actuator device 10 according to the first embodiment comprises a damper device in the form of a non-linear damper 92. The non-linear damper 92 comprises a first damper element in the form of a damper piston 94 and a second damper element in the form of a damper housing 96, which is for example formed as a cylinder. The damper piston 94 is translationally movable in the first direction and in the second direction in relation to the damper housing 96. Therein, the damper elements each partially bound two damper chambers 98 and 100 of the damper 92 in particular opposing each other, wherein the damper chambers 98 and 100 are fluidically connected or connectable to each other via two connecting paths 102 and 104. The connecting paths 102 and 104 are for example at least partially separated from each other.

The damper piston 94 is motion-coupled to the first valve element 78 and thus, in particular translationally, movable together with the valve element 78 in particular in relation to the basic element 72 in the first direction and in the second direction. For example, the damper housing 96 is, in particular translationally, movable along in the first direction and in the second direction in relation to the basic element 72. In addition, the damper housing 96 is coupled to the stops 88 and 90 such that the damper housing 96, the stop 88 and the stop 90 are commonly or simultaneously movable in the first direction and in the second direction in relation to the basic element 72. Therein, the previous and following explanations to the common movability of the valve element 78 and of the part T can for example readily also be transferred to the damper piston 94 and the valve element 78 or to the damper housing 96 and the stops 88 and 90 and vice versa. For example, if the damper piston 94 is translationally moved in relation to the damper housing 96 in the first direction, thus, the damper chamber 100 is thereby decreased in its volume, and the damper chamber 98 is increased in its volume, in particular to the extent, to which the damper chamber 100 is decreased. If the damper piston 94 is translationally moved in the second direction in relation to the damper housing 96, thus, the damper chamber 100 is thereby increased in its volume, and the damper chamber 98 is decreased in its volume, in particular to the extent, to which the damper chamber 100 is increased in its volume.

A throttle 106 is arranged in the connecting path 102, which can for example be formed as an adjustable or else rigid throttle. A check valve 108 is arranged in the connecting path 104, which blocks towards the damper chamber 100 and opens towards the damper chamber 98. Thus, the check valve 108 allows a flow of a damping medium from the damper chamber 100 via the connecting path 104 and the check valve 108 into the damper chamber 98. However, a flow of the damping medium reverse thereto from the damper chamber 98 via the connecting path 104 and the check valve 108 into the damper chamber 100 is avoided by the check valve 108. The damping medium also referred to as damper medium was for example a gas or else preferably a liquid, in particular an oil. Thus, if the damper piston 94 is for example moved in the first direction in relation to the damper housing 96, thus, the damper fluid first accommodated in the damper chamber 100 is conveyed out of the damper chamber 100 by means of the damper piston 94 such that the damping medium at least predominantly or completely flows from the damper chamber 100 via the connecting path 104 and the check valve 108 into the damper chamber 98, for example in that the check valve 108 opens and hereby releases a flow cross-section, which causes a flow resistance for the damping medium lower with respect to the throttle 106. Thus, a first amount of the damping medium for example flows into the damper chamber 98 via the connecting path 104, while a flow of damping medium via the connecting path 102 into the damper chamber 98 for example remains undone or while an amount of the damping medium lower with respect to the first amount flows via the connecting path 102 and thus via the throttle 106 into the damper chamber 98.

For example, if the damper piston 94 is, in particular translationally, moved in the second direction in relation to the damper housing 96, thus, damping medium first accommodated in the damper chamber 98 is thereby conveyed out of the damper chamber 98 by means of the damper piston 94 such that the damping medium conveyed out of the damper chamber 98, in particular completely, flows via the connecting path 102 and thus via the throttle 106 into the damper chamber 100, in particular due to the fact that the check valve 108 blocks the connecting path 104 fora flow of the damping medium occurring from the damper chamber 98 into the damper chamber 100. By moving the damper piston 94 in the first direction occurring in relation to the damper housing 96, the non-linear damper 92 is compressed, that is shortened in length or swaged. By moving the damper piston 94 in the second direction occurring in relation to the damper housing 96, the non-linear damper 92 is elongated, that is expanded. Since the damping medium can flow over between the damper chambers 98 and 100 in compressing and expanding the damper 92, the respective relative movement between the damper elements occurring in expanding or compressing the damper 92 is damped, in particular by means of the damping medium. The damping in expanding the damper 92 is also referred to as "tensile stage", wherein the damping in compressing the damper 92 is also referred to as "compressive stage". Therein, it is provided that the compressive stage is softer or less stiff than the tensile stage. Thus, the compressive stage has a first damping constant, wherein the tensile stage has a second damping constant. Therein, the first damping constant is lower than the second damping constant. Thus, the compressive stage provides a lower damping force than the tensile stage with identical relative speed between the damper elements. Thus, if a first force, in particular a first compressive force, is for example exerted on the damper 92, to compress the damper 92 by means of the first force, thus, a first relative speed results from it, with which the damper elements translationally move in relation to each other in compressing the damper 92. For example, if a second force, in particular a second tensile force, is then exerted on the damper 92, to expand the damper 92 by means of the second force, thus, a second relative speed results from it, with which the damper elements move in relation to each other in expanding the damper 92. Since the compressive stage is now less strong, less stiff or softer than the tensile stage of the damper 92, that is since the damping constant of the compressive stage is lower than the damping constant of the tensile stage, the first relative speed is greater than the second relative speed if the second force corresponds to the first force with respect to its mathematic magnitude. Thus, compressions of the damper 92 are less severely damped than expansions of the damper 92. The movement of the part T in relation to the basic element 72 in the first direction is for example also referred to as positive deflection of the part T. The movement of the part T in relation to the basic element 72 in the second direction is for example also referred to as negative deflection of the actuator 34 or of the part T. It is apparent from FIG. 1 that the damper piston 94 is motion-coupled to the valve element 78 and to the part T such that for example if the part T and the valve element 78 are, in particular translationally, moved in relation to the basic element 72 in the first direction with a seventh speed and/or by a seventh path, the damper piston 94 is, in particular translationally, moved in the first direction or in the second direction in relation to the basic element 72 with an eighth speed and/or by an eighth path, wherein the seventh speed corresponds to the eighth speed and the seventh path corresponds to the eighth path.

A spring element 110 is associated with the damper 92, which is coupled to the damper piston 94 on the one hand and to the damper housing 96 on the other hand. For example, the spring element 110 is formed as a mechanical spring. For example, if the damper piston 94 is moved in the first direction in relation to the damper housing 96 such that the damper 92 is compressed, thus, the spring element 110 is stressed, in particular compressed. If the damper piston 94 is moved in the second direction in relation to the damper housing 96, such that the damper 92 is expanded, thus, the spring element 110 is thereby relaxed, in particular expanded. In particular if the spring element 110 is stressed, the spring element 110 can provide a spring force, by means of which the damper 92 can be expanded in particular if a sufficiently long time is given to the spring element 110.

In FIG. 2, three distances s1, s2 and s3 are shown. The distance s1 extends parallel to the first or second direction and is a distance between the stops 86 and 88. The distance s2 also extends parallel to the first or second direction and thus parallel to the distance s1 and is a distance between the stops 86 and 90. The distance s3 also extends parallel to the first or second direction and thus parallel to the distances s1 and s2 and is a distance between the stop 90 and the basic element 72. If the distance s1 is greater than 0, thus, the stops 86 and 88 are spaced from each other along the first or second direction, that is opened. However, if the distance s1 is 0, thus, the stops 86 and 88 are in mutual contact, such that the stops 86 and 88 are closed. The same applies to the distance s2. If the distance s2 is greater than 0, thus, the stops 86 and 90 are spaced from each other and thus opened. If the distance s2 is 0, thus, the stops 86 and 88 are in mutual contact such that they are closed. If the distance s3 is greater than 0, thus, the stop 90 is spaced from the basic element 72 representing a fourth stop such that the stop 90 and the basic element 72 functioning as a fourth stop are opened. However, if the distance s3 is 0, thus, the stop 90 is in contact with the basic element 72, the stop 90 and the basic element 72 functioning as a fourth stop are closed. The stops 88 and 90 are commonly or simultaneously movable in the first or second direction in relation to the basic element 72 and therein for example movable together with the damper housing 96. In addition, the stop 86 is movable in the first or second direction in relation to the basic element 72 and in relation to the stops 88 and 90, in particular with the location S2, the valve element 80 and/or the conveying element 40. Thereby, the distances s1, s2 and s3 can vary such that the distances s1, s2 and s3 each can take the value 0 and values greater with respect to 0. Preferably, the spring element 110 is stronger than the spring element 74 such that the spring element 110 for example has a first spring constant and the spring element 74 has a second spring constant, wherein the first spring constant is greater than the second spring constant.

Figure 3:
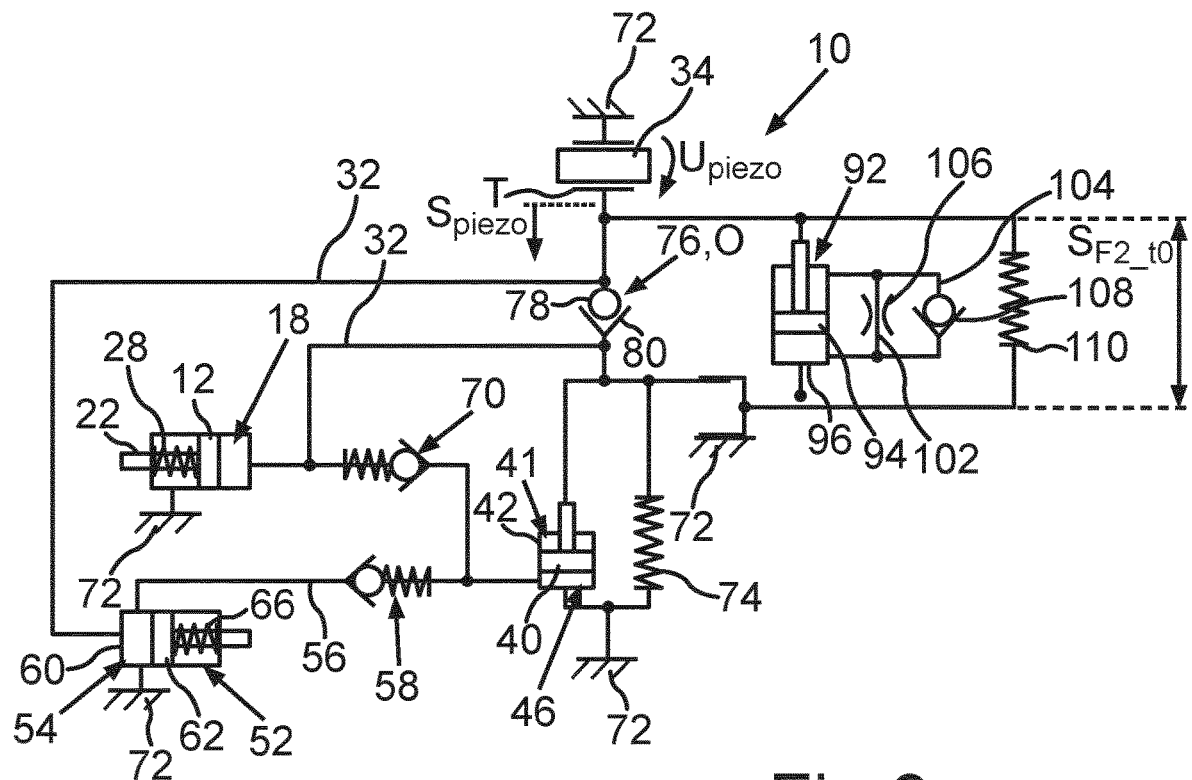
FIG. 3 a further schematic representation of the actuator device according to FIG. 1.

FIG. 3 shows the actuator device 10 and a constraint before the or an actuation of the actuator 34, respectively. According to FIG. 3, a control of the actuator 34 or supply of the actuator 34 with electrical voltage for example remains undone and the valve device 76 is for example opened. In addition, it is preferably provided that the distances s1 and s3 are 0 such that the stops 86 and 88 are in mutual contact and such that the stop 90 and the basic element 72 are in mutual contact. FIG. 3 shows the actuator device 10 for example at a first point of time t0, at which the spring element 110 and/or the damper 92 for example have a first length or a first deflection, which is denoted by $s_{F2\_t0}$ in FIG. 3. At the point of time t0, the spring element 74 presses the stop 86 against the stop 88 such that the stops 86 and 88 contact each other, and the spring element 110 presses the stop 90 against the basic element 72 such that the distance s3 is 0. Since the spring element 110 is stronger than the spring element 74, the stop 90 remains in contact with the basic element 72 and the distance s3 remains 0, respectively. At the point of time t0, the valve device 76 for example formed as a mechanically controlled valve is open and the part T is for example deflected by half of the maximum stroke in order that the part T can be maximally deflected by supplying the actuator 34 with the electrical voltage. Thus, it is for example provided at the point of time t0 that the actuator 34 is supplied with an electrical voltage, in particular such that the part T is deflected by half of its maximum stroke. For example, the actuator 34 requires or performs a deflection or such a deflection of the actuator 34 is effected, which is minimally larger than the opening of the valve device 76 or minimally larger than it is required for opening the valve device, thus minimally larger than the distance between the valve elements 78 and 80 is, in particular viewed along the respective direction of movement. Thus, the required deflection of the actuator 34 can theoretically be at least 40 or 60%, in particular of the maximum stroke. This only depends on the adjusted distance of the valve device 76 in the opened state. However, a required opening of the valve device 76 of at least 50% of the max. deflection or the maximum stroke of the actuator 34 is advantageous since otherwise the opening cross-section of the valve device 76 is low in draining the fluid from the output chamber 18 and thus the drain takes longer.

This for example means that the part T is movable between a minimum deflection and a maximum deflection, wherein the maximum deflection is also referred to as maximum stroke. By supplying the actuator 34 with electrical energy or electrical voltage, the part T can for example be maximally deflected and thus be deflected by its maximum deflection starting from the minimum deflection. For example, if supply of the actuator 34 with electrical voltage is prevented, thus, the part T can take its minimum deflection, which is also referred to as zero position or initial position. If the part T is deflected by the maximum deflection starting from the minimum deflection, thus, the part T travels a distance, which for example begins at the minimum deflection and ends at the maximum deflection. If the part T is deflected by 50 percent of the maximum deflection, thus, the part T is at half of the previously mentioned distance. This is for example the case at the point of time to. For example, the deflection of the part T in particular starting from the minimum deflection is the greater the greater the electrical voltage is, with which the actuator 34 is supplied. For example, in order to adjust the minimum deflection of the part T, the electrical voltage, with which the actuator 34 is supplied, is 0. In order to for example effect the maximum deflection of the part T, the electrical voltage has a, its or the maximum value. In order to keep the part T maximally deflected, the actuator 34 is at least substantially continuously supplied with the voltage having the deflection value. For example, in order to deflect the part T by 50 percent of the maximum deflection, a further deflection value of the electrical voltage, with which the actuator 34 is supplied, is for example adjusted, wherein the further deflection value is for example 50 percent of the first deflection value preferably greater with respect to 0.

FIG. 3 shows the actuator device 10 at a second point of time t1, which temporally follows the first point of time t0. The electrical voltage, with which the actuator 34 is supplied, is for example an electrical direct current voltage, which is also referred to as DC or DC voltage. For example, if the voltage, with which the actuator 34 is supplied for example at the point of time t0, is increased in its value or deflection value, thus, the part T is thereby further deflected starting from the first point of time t0, whereby a length or length increase of the actuator 34 is effected. In other words, the part T is hereby moved in the first direction in relation to the basic element 72. As is apparent from a synopsis of FIGS. 3 and 4—the valve device 76 is hereby closed, such that the valve device 76 is in its closed state S at the second point of time t1. Herein, the spring element 110 or the damper 92 has a second deflection or second length $s_{F2\_t1}$, which is lower than the length or deflection $s_{F2\_t0}$ at the point of time to. In other words, it applies: $s_{F2\_t1} < s_{F2\_t0}$ The compressive stage of the damper 92 is softer or less hard or less stiff than the tensile stage. In other words, the tensile stage of the damper 92 is harder or stiffer than the compressive stage since the check valve 108 opens in compressing the damper 92 and the check valve 108 closes in expanding the damper 92. Starting from the point of time t0, by moving the part T in the first direction occurring in relation to the basic element 72, the damper 92 can be compressed and thereby the valve element 78 can be effected in the first direction in relation to the basic element 72 and moved towards the valve element 80 and thereby the valve device 76 can be closed, while the distances s1 and s3 remain zero since the damper 92, upon its compression, is sufficiently soft and in particular softer than upon its expansion.

Figure 5:
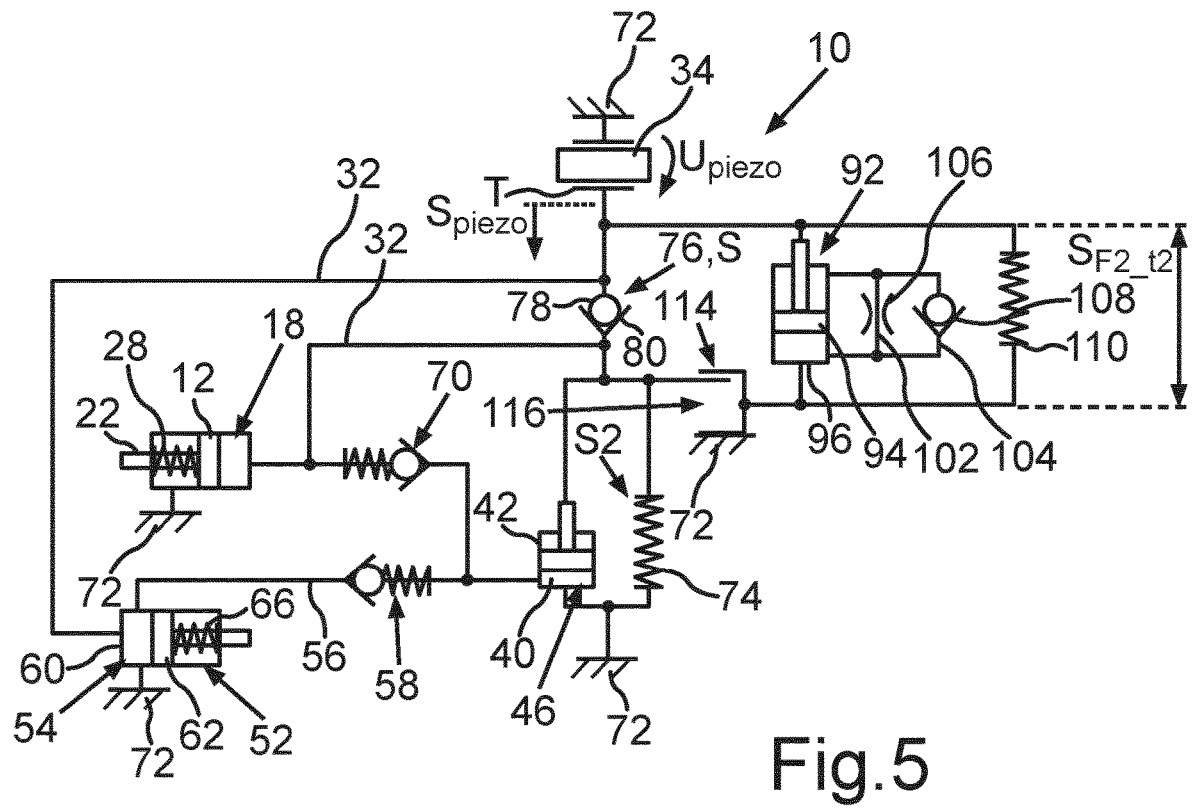
FIG. 5 a further schematic representation of the actuator device according to FIG. 1.
Figure 6:
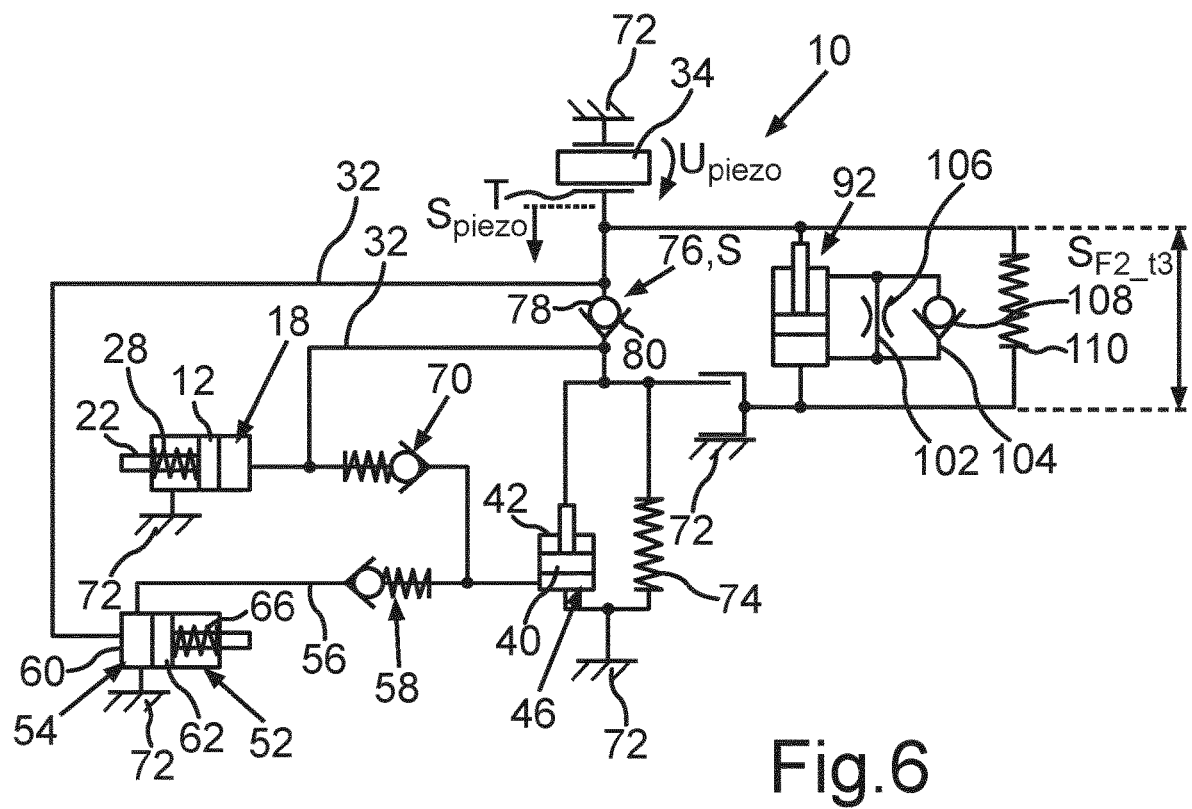
FIG. 6 a further schematic representation of the actuator device according to FIG. 1.

FIGS. 5 and 6 illustrate pumping of the fluid into the output chamber 18, while the valve device 76 is closed and remains closed. After previously described closing of the valve device 76 at the second point of time t1 and in particular after applying the DC voltage to the actuator 34, the electrical voltage is for example applied to the actuator 34 as an electrical alternating current voltage (AC voltage) to start, that is to effect, the pumping operation also referred to as pumping procedure. Thus, if the voltage, with which the actuator 34 is supplied, is further increased starting from the point of time t1, in particular within the scope of the previously mentioned AC voltage, thus, the part T is further deflected, that is moved in the first direction in relation to the basic element 72. Since the valve device 76 is herein closed, by moving the part T and the valve element 78 in the first direction occurring in relation to the basic element 72, the conveying element 40 too and for example also the second location S2 is moved in the first direction, in particular in relation to the basic element 72. Hereby, the conveying chamber 46 is decreased in its volume or fluid is conveyed out of the conveying chamber 46 by means of the conveying element 40 and pumped into the output chamber 18. The volume of the conveying chamber 46 is also referred to as drive or conveying volume, which is decreased by the described deflection of the part T via the valve device 76. In this movement of the part T and of the valve element 78 in the first direction occurring in relation to the basic element 72, the non-linear damper 92 is, in particular further, compressed since its compressive stage is soft and since a movement of the damper housing 96 occurring in the first direction in relation to the basic element 72 is prevented or avoided in that the stop 90 is in contact with the basic element 72 or is supported on the basic element 72 along the first direction. As a result, at a third point of time t2 temporally following the point of time t1 and shown in FIG. 5, a deflection or length of the spring element 110 or of the damper 92 denoted by $s_{F2\_t2}$ occurs such that it applies: $s_{F2\_t2} < s_{F2\_t1}$. Since the conveying element 40 is therein, in particular translationally, moved in the first direction in relation to the basic element 72 and also in relation to the damper housing 96, the stop 86 is moved away from the stop 88, whereby the distance s1 becomes greater than 0 or is greater than 0 at the point of time t2. In other words, the stops 86 and 88 are spaced from each other at the point of time t2.

Since the actuator 34 is operated with the previously mentioned voltage preferably formed as an AC voltage during the pumping operation or for realizing the pumping operation, such that differently great values of the electrical voltage, with which the actuator 34 is supplied, are for example alternatingly adjusted, wherein it is preferably provided that at least one of the values is greater than 0 and also the other value is greater than 0 and different from the one value, wherein the other value can also be 0, the part T is alternatingly moved in the first direction and in the second direction in relation to the basic element 72 during the pumping operation. Thus, in order to move the conveying element 40, by means of which the fluid has been conveyed into the output chamber 18, in the second direction or in the second conveying direction in relation to the basic element 72 and in particular in relation to the conveying housing 42, to thus be able to convey, in particular suck, new fluid into the conveying chamber 46, the voltage, with which the actuator 34 is supplied, is reduced. Thereby, it is effected that the part T moves in the second direction in relation to the basic element 72. This is also referred to as retracting or length-shortening of the actuator 34. Due to the control of the actuator 34 with AC voltage, there exists only a short phase, during which the actuator 34 or the part T can retract until a subsequent increase of the voltage. Since the non-linear damper is very stiff in its expansion and thus in retracting the actuator 34 during the short period of time, the conveying element 110 causes no or only a very low expansion of the damper 92 during the short period of time, whereby—as it is shown from FIG. 6 based on a point of time t3 shown there, following the point of time t2—the valve device 76 remains closed and the stop 90 is moved away from the basic element 72, in particular in the second direction, hence the distance s3 becomes or is greater than 0. Therein, the distance s1 also becomes or is greater than 0 and the stop 86 is spaced from the stop 88, respectively, whereby the spring element 74 or the spring force thereof is released and thus the fluid is sucked into the conveying chamber 46 via the check valve 58 formed or functioning as a suction valve on the one hand and while the valve device 76 remains closed on the other hand. In particular, FIGS. 4 and 5 show respective states or positions of the actuator device 10, wherein the states or positions shown in FIGS. 5 and 6 consecutively alternate multiple times in the pumping operation. Hereby, fluid can be alternatingly conveyed from the conveying chamber 46 into the output chamber 18 and from the reservoir chamber 54 into the conveying chamber 46. In other words, in the pumping operation, by the control of the actuator 34 with the electrical voltage formed as the AC voltage, it is alternatingly and consecutively changed between the states of the actuator device 10 shown in FIGS. 5 and 6, whereby the fluid is conveyed into the output chamber 18. Hereto, the valve elements 78 and 80 and the conveying element 40 with them are alternatingly moved and thus reciprocated in the first direction and in the second direction, wherein the damper 92 and thus the damper elements as well as the stops 86, 88 and 90 herein move along at least substantially as a block in the first direction and in the second direction in relation to the basic element 72. Since the tensile stage of the non-linear damper 92 is stronger or stiffer than the compressive stage, in retracting the actuator 34, no or only a very slight expansion of the damper 92 occurs such that the valve elements 78 and 80 do not or not as far move away from each other as the valve device 76 is opened. Thus, the valve device 76 remains closed in reciprocating the conveying element 40 and the valve elements 78 and 80. Therein, the spring element 110 or the damper 92 has a length or deflection at the point of time t3, which is denoted by $s_{F2\_t3}$. Since the tensile stage of the damper 92 is stiffer or harder than the compressive stage, in retracting the actuator 34, a substantial expansion of the damper 92 does not occur such that at the third point of time t3, it applies: $s_{F2\_t2} = s_{F2\_t3}$ or $s_{F2\_t2} \approx s_{F2\_t3}$. By conveying the fluid into the output chamber 18, the output element 12 is moved into the retaining position. For example, if a further movement of the output element 12 is then to remain undone and the output element 12 is to be retained in the retaining position, thus, the actuator 34 is then for example again controlled with a DC voltage, whereby the valve device 76 is kept closed.

Figure 7:
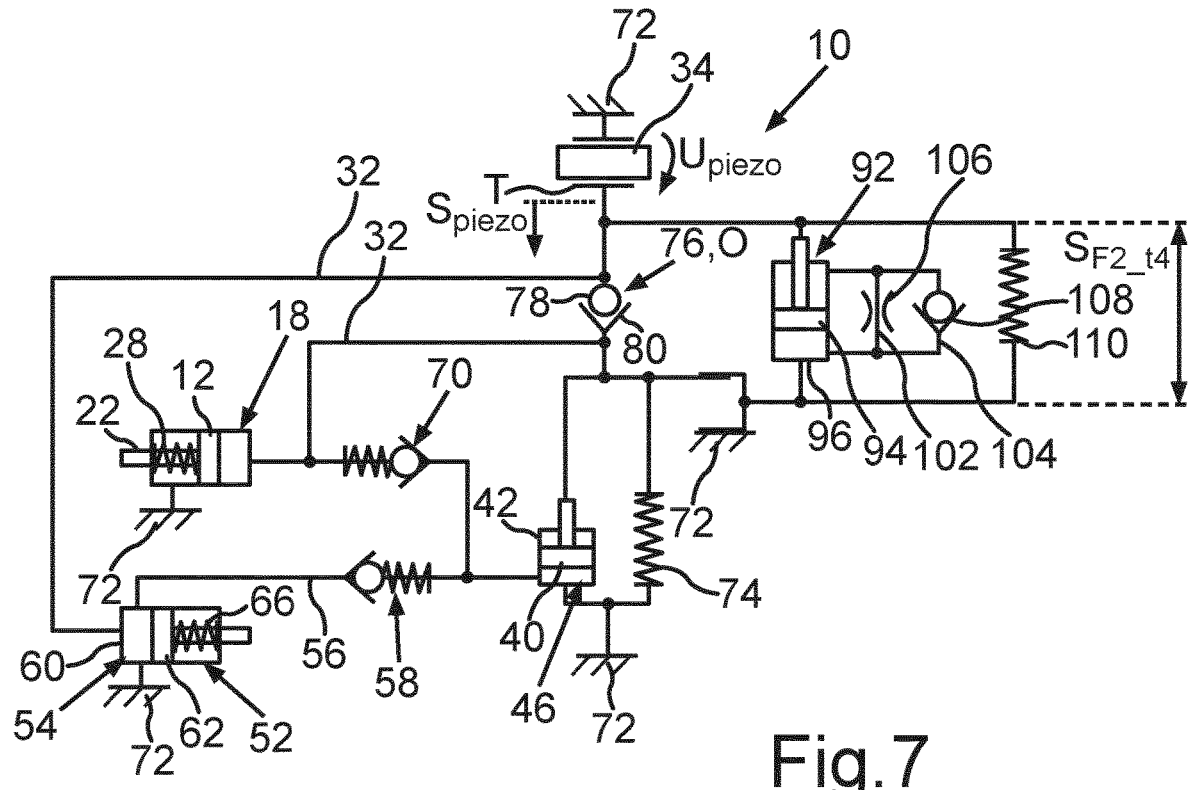
FIG. 7 a further schematic representation of the actuator device according to FIG. 1.

For example, in order to allow a movement of the output element 12 from the retaining position into the evasive position and to open the valve device 76 hereto, the previously adjusted voltage in particular formed as a DC voltage is for example, in particular slowly, lowered, in particular to 0. Then, the spring element 110 or the spring force thereof allows extracting the non-linear damper 92 such that the damper 92 or the spring element 110 has a length or deflection $s_{F2\_t4}$ at fifth point of time t4 shown in FIG. 7 and following the point of time t3. Then, it for example applies: $s_{F2\_t4} > s_{F2\_t3}$. As a result, the fluid can flow from the output chamber 18 into the reservoir chamber 54. Alternatively, lowering the voltage can be fast effected. Then, the stop 90 would lift from the basic element 72, but the spring element 110 then first has to extract the damper (takes "slightly" longer than the pumping frequency) to open the valve device.

Figure 8:
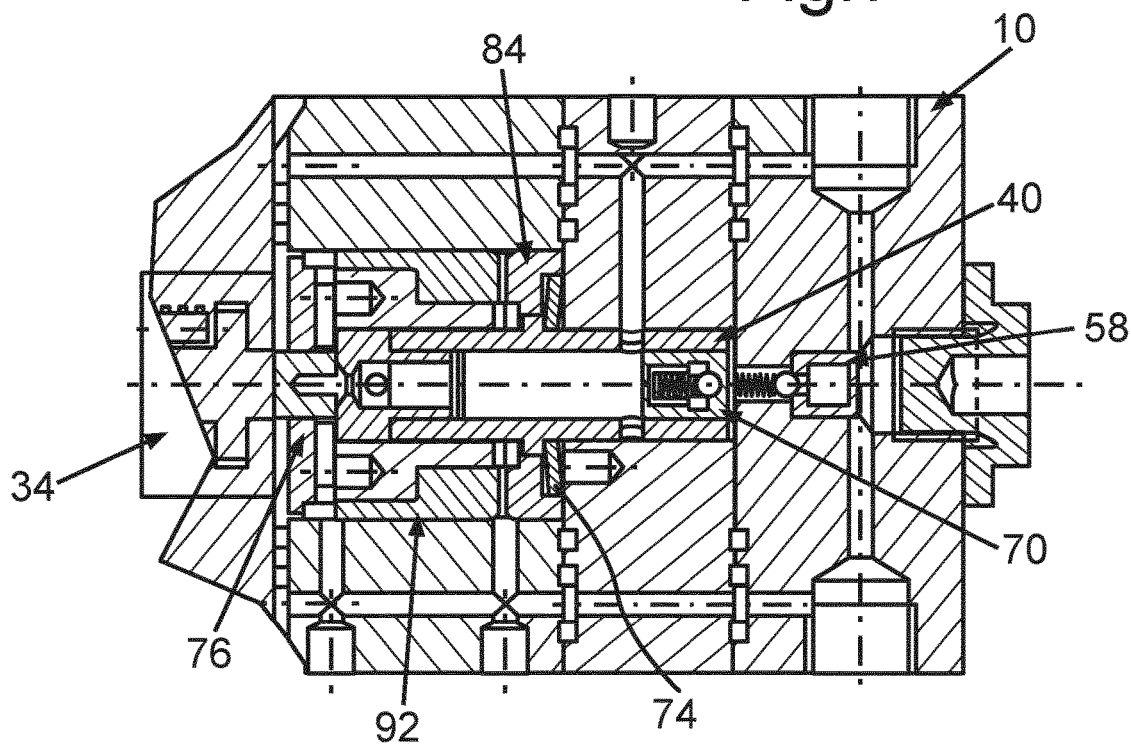
FIG. 8 partially a schematic sectional view of a second embodiment of the actuator device.
Figure 9:
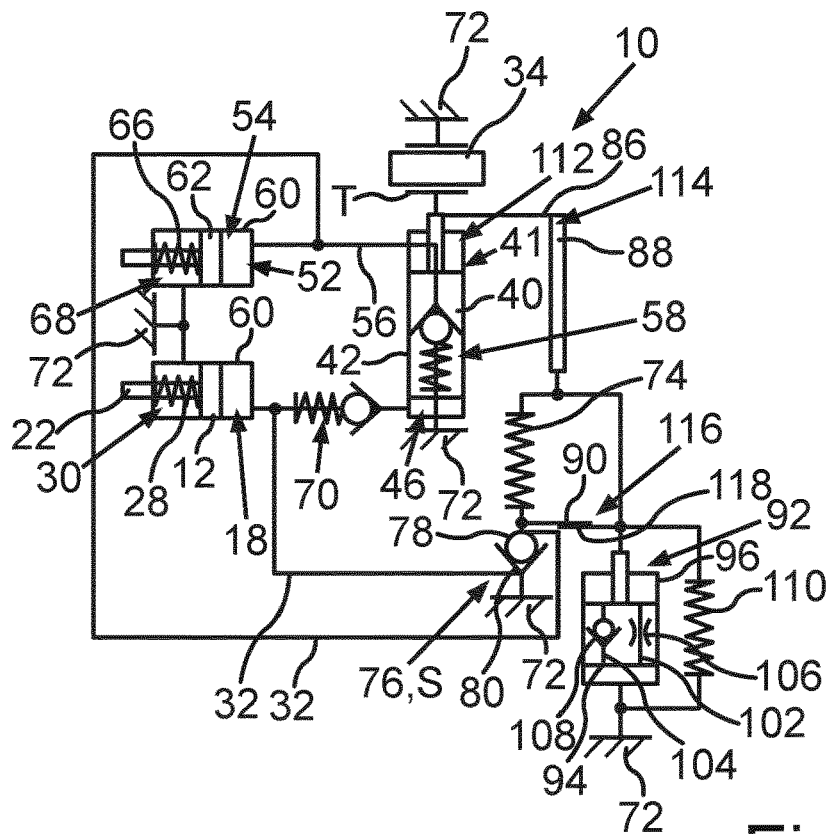
FIG. 9 a schematic sectional view of a third embodiment of the actuator device.

Therein, the time behavior of opening the valve device 76 depends on the time or damping behavior of the non-linear damper 92, in particular in tensile direction or with respect to the tensile stage. This time or damping behavior should be matched to a frequency, with which the conveying element 40 and for example the valve elements 78 and 80 with it are alternatingly moved in the first direction and in the second direction, that is reciprocated, in the pumping operation. Since the fluid is hereby pumped, the frequency is also referred to as pumping frequency. The time behavior should be matched to the pumping frequency, since too fast pulling apart or expanding the damper 92 would entail opening the valve device 76 upon too slow pumping, that is if an excessively long time is between lowering the voltage and following raise of the voltage in the pumping operation. FIG. 8 shows a second embodiment of the actuator device 10. In particular, a mechanical implementation of the actuator device 10 is apparent from FIG. 8.

FIGS. 9 to 13 illustrate a third embodiment of the actuator device 10. In the third embodiment, the conveying element 40 also referred to as drive piston or conveying piston is motion-coupled to the part T of the actuator 34 while bypassing the valve device 76, in particular in direct manner or such that if the part T is moved with a ninth speed and/or by a ninth path in the first or second direction in relation to the basic element 72, as a result, the conveying element 40 is moved in the first or second direction in relation to the basic element 72 with a tenth speed and/or a by tenth path, wherein the ninth path corresponds to the tenth path and the ninth speed corresponds to the tenth speed, respectively. For example, in order to move the conveying element 40 by means of the part T in the first and second embodiments, the part T provides an actuation force, which is transferred from the part T to the conveying element 40 via a transfer path, in particular to thereby, in particular translationally, move the conveying element 40 in the first conveying direction or in the first direction in relation to the basic element 72. In the first and second embodiments, the valve device 76 is arranged in the transfer path. In the third embodiment, the valve device 76 is arranged outside of the transfer path such that the actuation force provided by the part T for moving the conveying element 40 bypasses the valve device 76, that is the valve elements 78 and 80, and thus does not pass via or through the valve elements 78 and 80 on its path from the part T to the conveying element 40.

In addition, it is provided in the third embodiment that the check valve 58 formed or functioning as a suction valve is received in the conveying element 40 formed as a conveying piston and thus is integrated in the conveying element 40. Thus, the check valve 58 is for example movable together with the conveying element 40 in the first or second conveying direction, in particular in relation to the basic element 72 and/or in translational manner. In addition, at least a part of the channel 56 extends through the conveying element 40 and in particular through a further chamber 112, which opposes the conveying chamber 46 and/or is respectively partially bounded by the conveying element 40 and the conveying housing 42. Thus, the fluid flows through the chamber 112 and through the conveying element 40, in which the check valve 58 arranged in the channel 56 is arranged, on its path from the reservoir chamber 54 to the or into the conveying chamber 46. Furthermore, it is provided in the third embodiment that the valve element 80 is fixed to the basic element 72 at least in the first direction and the second direction such that, in particular translational, relative movements between the valve element 80 and the basic element 72 occurring in the first direction and in the second direction in relation to the basic element 72 are prevented. In addition, the connecting paths 102 and 104 and thus the throttle 106 and the check valve 108 are arranged in the damper piston 94 and thus, in particular translationally, movable together with the damper piston 94, in particular in relation to the damper housing 96.

In the first embodiment, the stops 86 and 88 for example form a first stop pair 114, which is also referred to as first contact. Therein, by the feature that the stops 86 and 88 are spaced from each other or that the distance s1 is greater than 0, it is to be understood that the stop pair 114 or the first contact is opened. In the third embodiment, the stop pair 114 also includes the stops 86 and 88. In addition, in the first embodiment, the stop 90 and the basic element 72 form a second stop pair 116, which is also referred to as second contact. By the feature that the distance s3 is greater than 0 or that the stop 90 and the basic element 72 are spaced from each other, it can in particular be understood that the stop pair 116 or the second contact is opened. In the third embodiment, the stop pair 116 includes the stop 90 and a stop 118, which is also referred to as stop element. The stops 88 and 118 are, in particular commonly or simultaneously, in particular translationally, movable in relation to the basic element 72 in the first direction and in the second direction in particular together with the damper piston 94 and thus for example in relation to the damper housing 96. In the third embodiment, the damper housing 96 is fixed to the basic element 72 at least in the first direction and in the second direction. The stop 90 is coupled to the valve element 78 and therein for example commonly or simultaneously movable with the valve element 78 in the first direction and in the second direction in relation to the basic element 72. The stop 86 is coupled, in particular motion-coupled, to the part T and the conveying element 40 such that the part T, the conveying element 40 and the stop 86 are for example, in particular translationally, movable in the first direction and in the second direction in relation to the basic element 72. In the first embodiment, the stops 86 and 90 for example form a third stop pair, which is omitted in the third embodiment. In particular, the stop 88 is formed by a tappet, which is used for actuating the valve device 76 and the non-linear damper 92, in particular with regard to the compression thereof, and hereto is movable or moved in the first direction, in particular in relation to the basic element 72 and/or in translational manner, in particular via the stop 88 by means of the part T.

Figure 10:
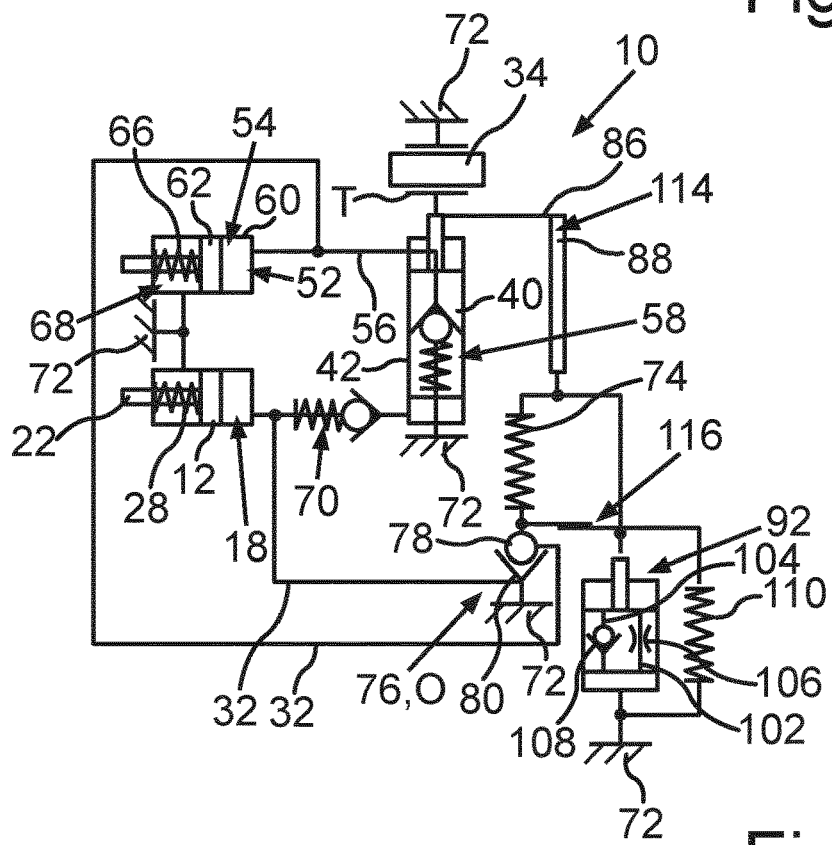
FIG. 10 a further schematic representation of the third embodiment of the actuator device.

FIG. 10 shows the actuator device 10 in an open state such that FIG. 10 for example corresponds to FIG. 1 or FIG. 3. In FIG. 10, the actuator 34 is for example deenergized such that the part T assumes no deflection or a minimum deflection. In addition, both the first contact (stop pair 114) and the second contact (stop pair 116) are closed, and the valve device 76 also referred to or functioning as a drain valve is opened, in particular because the spring element 110 is stronger than the spring element 74. Hereby, the spring element 110 presses the stop 118 against the stop 90 and the spring element 110 additionally presses the stop 88 against the stop 86. As a result, the valve element 78 is moved away from the valve element 80 via the stops 90 and 118 such that the spring element 110 keeps the valve device 76 opened.

Figure 11:
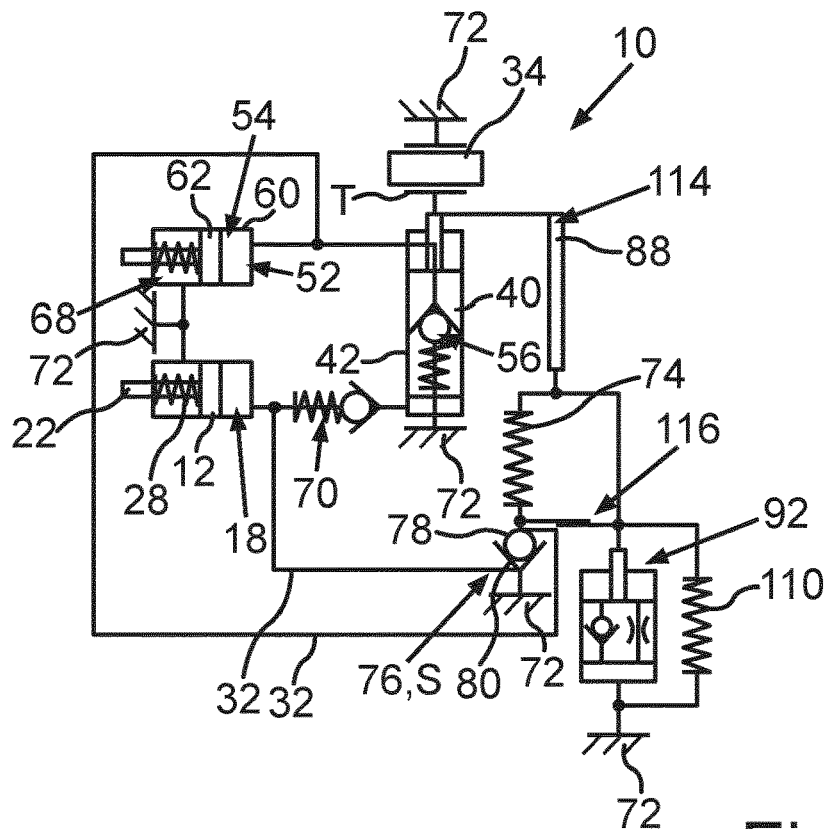
FIG. 11 a further schematic representation of the third embodiment of the actuator device.

FIG. 11 shows the retaining operation also referred to as retaining state such that the valve device 76 is for example closed and kept closed by means of the actuator 34 in FIG. 11, in particular in that the actuator 34 is supplied with the electrical voltage as the DC voltage, such that the part T takes at least substantially 50 percent of its maximum stroke or its maximum deflection or as much as the valve device is or remains closed. In the retaining state or in the retaining operation, the first contact and the second contact are also closed, wherein the spring element 110 is slightly compressed compared to FIG. 10 for example by the deflection of the part T such that the spring element 110 keeps the second contact closed while the valve device 76 is closed.

Figure 12:
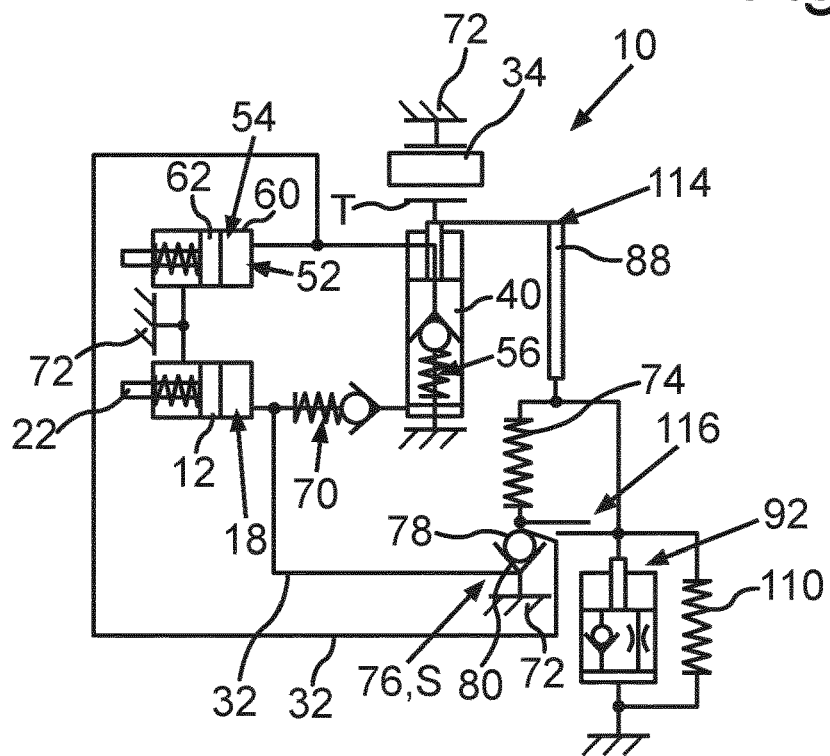
FIG. 12 a further schematic representation of the third embodiment of the actuator device.

FIG. 12 illustrates pumping of the fluid from the conveying chamber 46 into the output chamber 18, wherein the actuator 34 is, in particular dynamically, controlled with the electrical voltage formed as the AC voltage hereto, in particular such that the electrical voltage, with which the actuator 34 is controlled, is alternatingly and consecutively increased and decreased. In or for conveying the fluid from the conveying chamber 46 into the output chamber 18, the first contact is closed and the second contact is opened since the spring element 110 cannot close the second contact in the dynamic operation due to the non-linear damper 92 or by the fact that the tensile stage of the non-linear damper 92 is very hard and in particular harder than the compressive stage, or a period of time between beginning of lowering or decreasing the electrical voltage and a subsequent beginning of an increase of the voltage is too low that the spring element 110 could expand the damper 92 and close the second contact as a result such that opening of the valve device 76 occurs.

Figure 13:
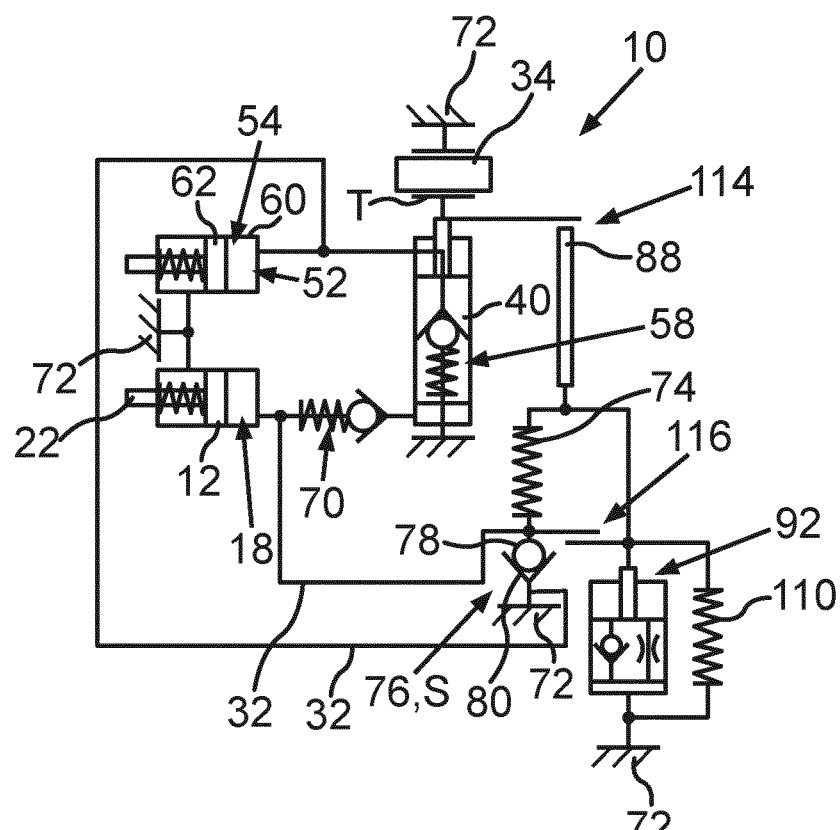
FIG. 13 a further schematic representation of the third embodiment of the actuator device.

Finally, FIG. 13 illustrates conveying of the fluid from the reservoir 52 into the conveying chamber 46. Hereto, the voltage formed as the AC voltage, which has been increased for conveying the fluid into the output chamber 18, is decreased in the dynamic pumping operation, whereby the part T and the conveying element 40 with it is moved in the second direction in relation to the conveying housing 42. This movement is effected faster than an expansion of the damper 92 effected or capable of being effected by the spring element 110 and required for closing the second contact or keeping it closed such that the damper 92 keeps the valve device 76 closed, the first contact is opened and the second contact is also opened. In the pumping operation, thus, the conveying element 40 and the stop 86 are alternatingly fast moved in the first direction and in the second direction and thus reciprocated by means of the part T such that opening of the valve device 76 remains undone. In conveying the fluid into the output chamber 18, the first contact is closed, while the second contact remains opened, and in conveying the fluid into the conveying chamber 46, the first contact and the second contact are opened such that both contacts are simultaneously opened. The non-linear damper 92, in particular the non-linearity or low-pass behavior thereof, prevents excessive deflections of the spring elements 74 and 110 such that the drain valve is and remains closed.

Figure 14:
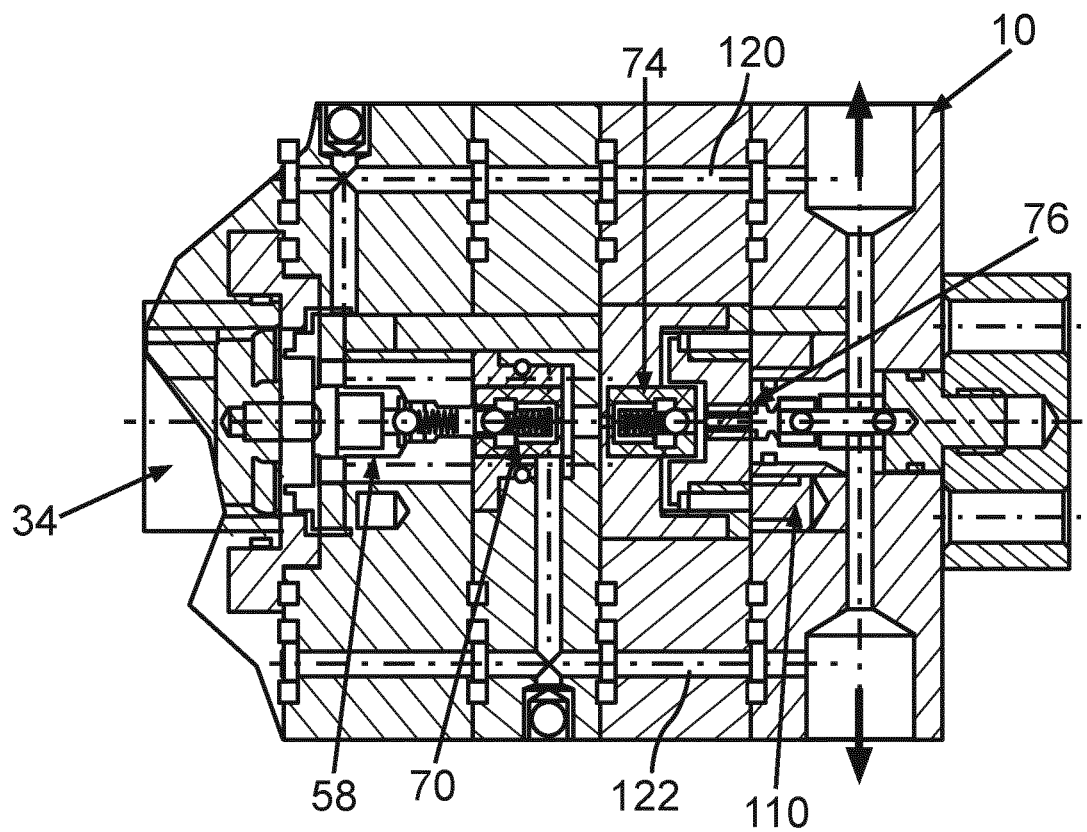
FIG. 14 partially a schematic sectional view of a fourth embodiment of the actuator device.

FIG. 14 shows a fourth embodiment of the actuator device 10. In particular, FIG. 14 illustrates a mechanic implementation of the actuator device 10. A port fluidically connected to the reservoir 52 is denoted by 120 in FIG. 14 and a port fluidically connected to the output chamber 18 is denoted by 122 in FIG. 14.

Figure 15:
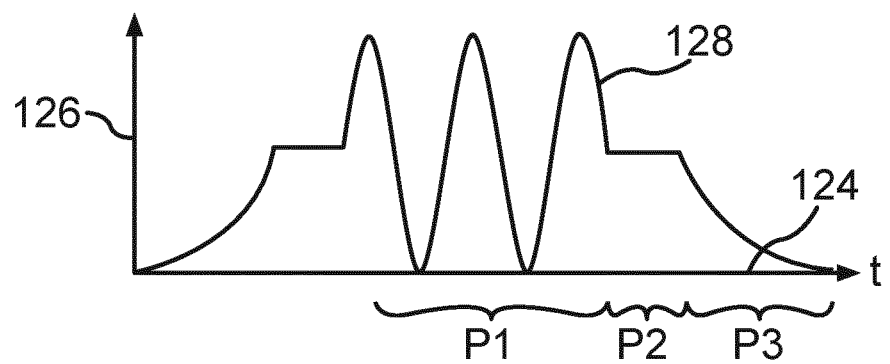
FIG. 15 a diagram for illustrating a control of an actuator of the actuator device.

FIG. 15 shows a diagram, on the abscissa 124 of which the time is plotted. On the ordinate 126 of the diagram shown in FIG. 15, the voltage is plotted, which is applied to the actuator 34. A progression 128 is registered in the diagram shown in FIG. 15, which illustrates the voltage, with which the actuator 34 is supplied, over time. Thus, the progression 128 is a temporal progression of the voltage, which is applied to the actuator 34. In FIG. 15, a first period of time is denoted by P1, in which the pumping operation occurs. In addition, a second period of time P2 following the first period of time P1 is shown in FIG. 15, in which the actuator device 10 is in its retaining operation or in its retaining state. In addition, a third period of time P3 following the second period of time P2 is shown in FIG. 15, during which the actuator device 10 is in its opening operation. It is apparent from FIG. 15 that for pumping the fluid into the output chamber 18, the voltage is fast consecutively and alternatingly increased and decreased as an AC voltage. Thereupon, the voltage is kept at least substantially constant to retain the output element 12 in the retaining position. In order to allow or effect a movement of the output element 12 from the retaining position into the evasive position, the voltage, with which the actuator 34 is supplied, is, in particular slowly, decreased during the period of time P3 to thereby effect opening of the valve device 76.

Figure 16:
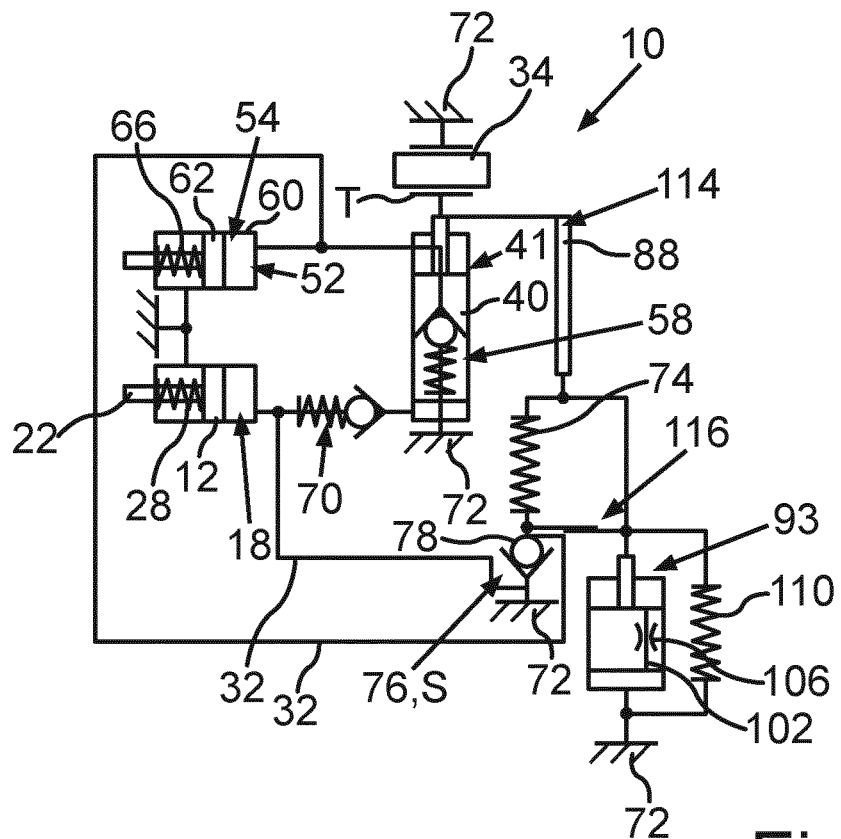
FIG. 16 a schematic representation of a fifth embodiment of the actuator device.

FIG. 16 shows a schematic representation of a fifth embodiment of the actuator device 10. In the fifth embodiment, the damper device is for instance not formed as a non-linear damper, but as a linear damper 93. This means that the compressive stage and the tensile stage of the damper 93 are equally strong or equally stiff such that the compressive stage and the tensile stage of the damper 93 for example have identical damping constants. For the rest, the fifth embodiment corresponds to the fourth embodiment.

Figure 17:
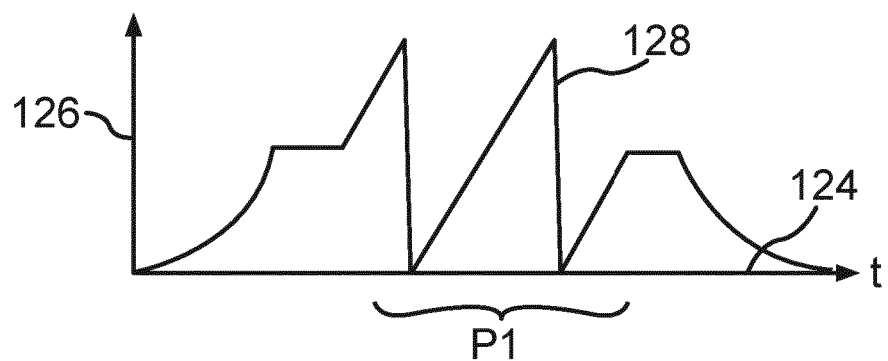
FIG. 17 a diagram for illustrating a further control of the actuator.

FIG. 17 shows the diagram according to FIG. 15, but wherein now the actuator 34 is controlled in a different manner with respect to FIG. 15 or with respect to the fourth embodiment—as is apparent based on the progression 128. By the control of the actuator 34 illustrated in FIG. 17, the pumping operation, the retaining operation and the opening operation can be realized without use of the non-linear damper 92 and in particular using the linear damper 93. Hereto—as is apparent based on the progression 128 in FIG. 17—it is slower increased than decreased or substantially faster decreased than increased during the dynamic pumping operation. Hereby, it is not given sufficient time to the spring element 110 to effect opening of the valve device 76. Thus, in the fifth embodiment too, in particular solely by the control, the valve device 76 is kept closed, in particular by means of the linear damper 93, while the voltage, with which the actuator 34 is supplied, is reduced within the scope of the pumping operation to convey, in particular suck, new fluid into the conveying chamber 46. It is apparent that the control, in particular in the first embodiment, is at least substantially sinusoidally effected. The control, in particular in the fifth embodiment, is for example effected sawtooth-shaped, but could alternatively also be effected pulse width modulated or in sinusoidal manner.

Figure 18:
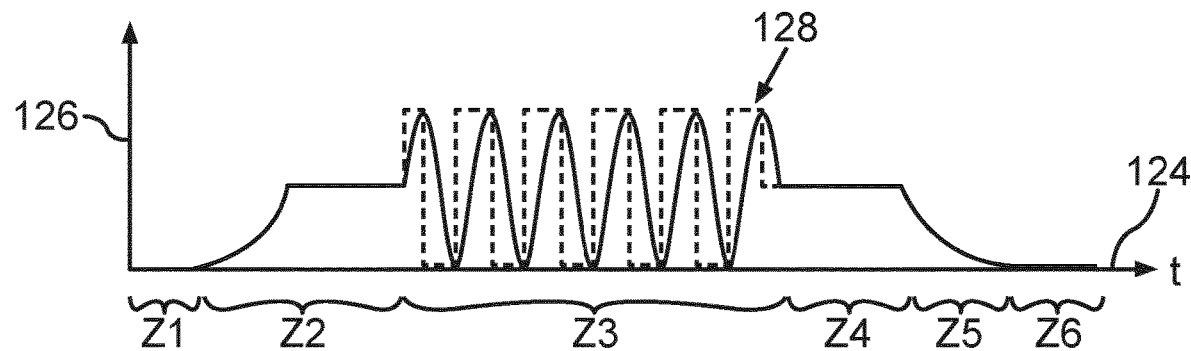
FIG. 18 a diagram for illustrating a further control of the actuator.
Figure 19:
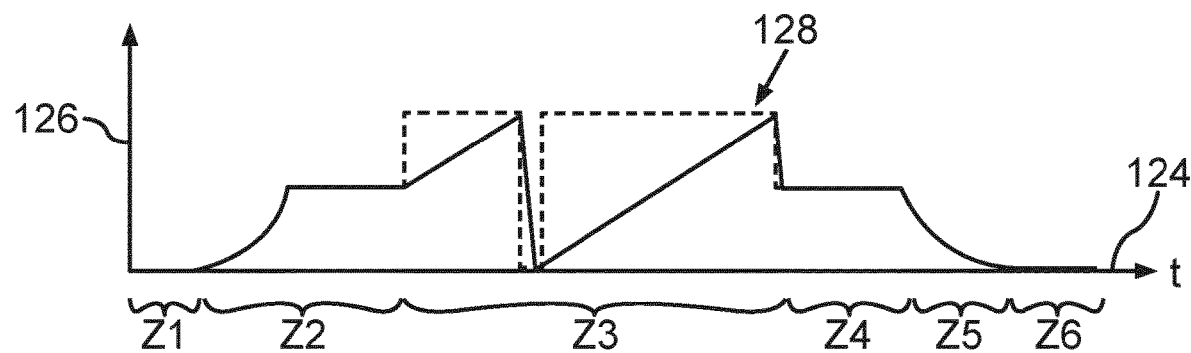
FIG. 19 a diagram for illustrating a further control of the actuator.

FIGS. 18 and 19 also show the diagram according to FIG. 17, but now with further controls of the actuator 34 illustrated by progressions 128. During a first period of time Z1, the valve device 76 is opened and the actuator 34 is not supplied with an electrical voltage such that the part T for example assumes its minimum deflection. During a second period of time Z2 following the first period of time Z1, the voltage, with which the actuator 34 is supplied, is first, in particular slowly, increased and then kept at least substantially constant, whereby the part T is moved in the first direction, in particular into a position, in relation to the basic element 72 and the valve device 76 is closed and the part T is kept in the mentioned position and the valve device 76 is kept closed. During a third period of time Z3 following the period of time Z2, the previously described pumping operation is effected, within the scope of which the part T and the conveying element 40 with it are moved in the first direction and in the second direction in relation to the basic element 72. During a period of time Z4 following the period of time Z3, the retaining operation is effected, during which the actuator 34 is supplied with an at least substantially constant voltage. Thereby, the valve device 76 is kept closed and the output element 12 is retained in the retaining position. During a period of time Z5 temporally following the period of time Z4, the opening operation is effected, in or during which the voltage, with which the actuator 34 is supplied, is reduced or decreased, in particular sufficiently slowly such that opening of the valve device 76, in particular by means of the spring element 110, is allowed or effected. A period of time Z6 follows the period of time Z5, during which the valve device 76, which is for example during the period of time Z1, is again opened. The same applies to FIG. 19.

Figure 20:
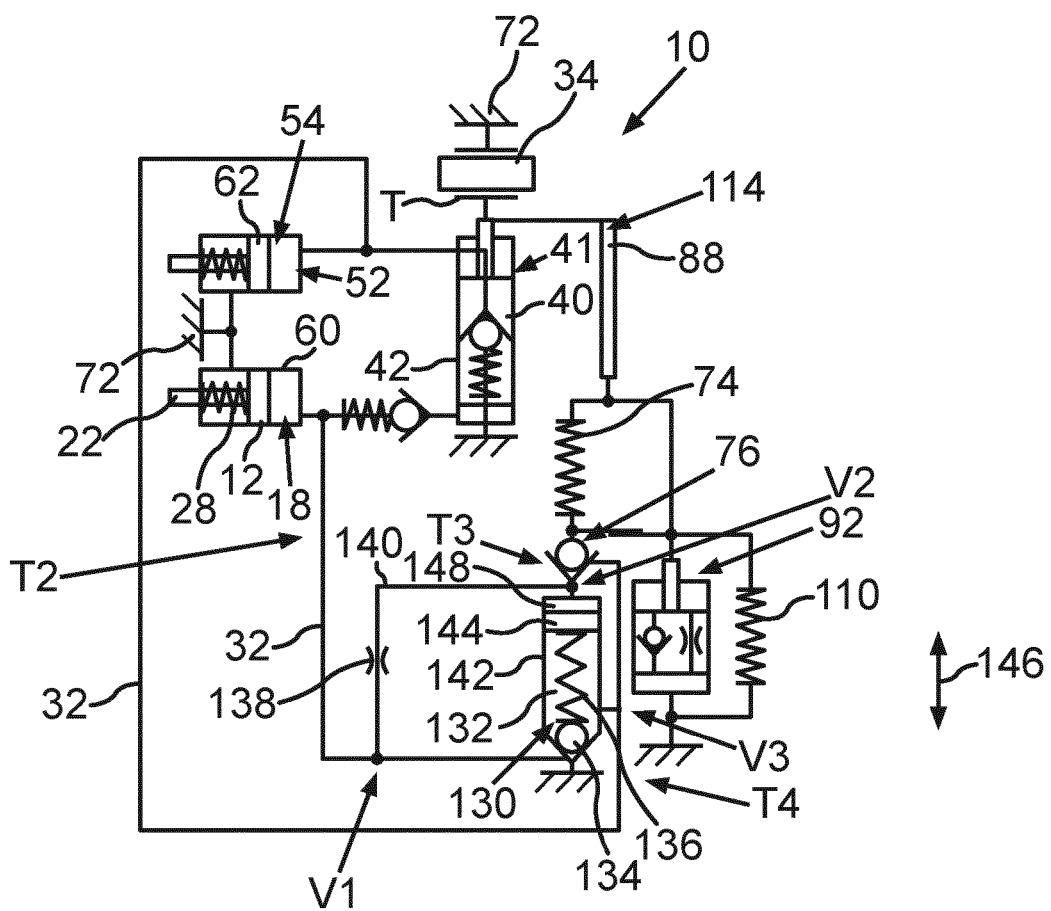
FIG. 20 a schematic representation of a sixth embodiment of the actuator device.

Finally, FIG. 20 shows a sixth embodiment of the actuator device 10. Therein, the actuator device 10 in particular comprises a servo valve 130 provided in addition to the valve device 76, which is also referred to as servo drain valve and is for example electrically operable. For example, the servo valve 130 is arranged or connected in series with the valve device 76 in the discharge channel 32, wherein the servo valve 130 is for example arranged upstream of the valve device 76 in flow direction of the fluid flowing from the output chamber 18 via the servo valve 130 and via the valve device 76 into the reservoir chamber 54. For example, the servo valve 130 can in turn be electrically switched between a second open state and a second closed state. In particular, the servo valve 130 can for example be switched at least from the second closed state into the second open state. Hereby, the discharge channel 32 can for example be particularly fast released. Hereby, a pre-chamber 132, in particular of the servo valve 130, can in particular for example be particularly fast opened or released such that at least a part of the fluid accommodated in the output chamber 18 can be drained into the pre-chamber 132 and thus discharged from the output chamber 18 or discharged from the output element 12 by switching the servo valve 130 into the second opening position. In the sixth embodiment as well as in all of the other embodiments, the valve device 76 is operated, in particular controlled or regulated, by means of the actuator 34.

The servo valve 130 comprises a valve element 134 and a valve spring 136, which has for example a low opening pressure of for example 1 bar. For example, if the fluid acting on the valve element 134 via the discharge channel 32 has a pressure, which is lower than the opening pressure, thus, the valve element 134 is kept closed by means of the valve spring 136. If the pressure of the fluid acting on the valve element 134 corresponds to the opening pressure or if the pressure of the fluid acting on the valve element 134 is greater than the opening pressure, thus, the valve element 134 is opened against the valve spring 136 as a result, whereby the servo valve 130 releases the discharge channel 32 or the pre-chamber 132. In other words, the discharge channel 32 comprises a channel part T2, which is arranged downstream of the output chamber 18 and upstream of the pre-chamber 132 in flow direction of the fluid flowing from the output chamber 18 to the valve device 76 or to the servo valve 130. In the second closed state, the channel part T2 is fluidically separated from the pre-chamber 132 by means of the valve element 134 such that the fluid cannot flow from the output chamber 18 into the pre-chamber 132. By shifting the servo valve 130 from the second closed state into the second opening state, the valve element 134 releases a fluidic connection between the channel part T2 and the pre-chamber 132. In other words, the pre-chamber 132 is released or fluidically connected to the channel part T2 such that at least a part of the fluid first accommodated in the output chamber 18 can flow out of the output chamber 18 and flow into the pre-chamber 132 via the channel part T2. This is in particular effected if the pressure of the fluid accommodated in the channel part T2 and, in particular directly, acting on the valve element 134 corresponds to or is greater than the opening pressure.

A throttle 138 is associated with the servo valve 130, which is arranged or connected in parallel with the servo valve 130, in particular with the pre-chamber 132 and with the valve element 134. The throttle 138 is arranged in a bypass channel 140, which throttle is fluidically connected to the channel part T2 at respective junctions V1 and fluidically connected to a further channel part T3 of the discharge channel 32 at a junction V2. Therein, the bypass channel 140 can for example be a constituent of the discharge channel 32. The junction V1 is arranged upstream of the valve element 134 in flow direction of the fluid flowing from or out of the output chamber 18 through the channel part T2 to the servo valve 130 and via the servo valve 130 to the valve device 76, wherein the junction V2 is arranged downstream of the servo valve 130, in particular of the valve element 134, and upstream of the valve device 76 related to the previously mentioned flow direction. The fluid flowing through the bypass channel 140 bypasses the servo valve 130 and thus does not flow through the servo valve 130, but flows through the bypass channel 140 to the valve device 76 while bypassing the servo valve 130. In flow direction of the fluid flowing from the output chamber 18 to the reservoir chamber 54, a third channel part T4 of the discharge channel 32 is arranged downstream of the valve device 76, such that the fluid coming from the valve device 76 is passed to the reservoir chamber 54 by means of the channel part T4.

Therein, the servo valve 130 comprises a valve housing 142, in which a valve piston 144 of the servo valve 130 is translationally movably accommodated. Therein, the valve piston 144 can translationally move along a piston direction illustrated by a double arrow 146 in FIG. 20 in relation to the valve housing 142. Therein, the valve spring 136 is at least indirectly, in particular directly, supported on the valve piston 144 on the one hand and at least indirectly, in particular directly, supported on the valve element 134 on the other hand along the piston direction. Therein, the pre-chamber 132 is formed or bounded in part by the valve housing 142 and in part by the valve piston 144. In addition, the servo valve 130 comprises a further valve chamber 148, which for example opposes the pre-chamber 132, in particular along the piston direction. Therein, the channel part T4 fluidically connected to the valve device 76 on the one hand and to the reservoir chamber 54 on the other hand is fluidically connected to the pre-chamber 132 at a junction V3, wherein the junction V3 is arranged downstream of the valve device 76 and upstream of the reservoir chamber 54 in flow direction of the fluid coming from the valve device 76 and flowing to the reservoir chamber 54. If the valve piston 144 is correspondingly moved in relation to the valve housing 142 such that a volume reduction of the pre-chamber 132 occurs, thus, a volume increase of the valve chamber 148 occurs to the same extent and vice versa.

Overall, it is apparent that the valve device 76 is operated, in particular controlled or regulated, by means of the actuator 34, in particular with regard to opening and closing the valve device 76, in the sixth embodiment as well as in the other embodiments. In particular if the pressure of the fluid acting on the valve element 134, in particular in the channel part T2, is less than the opening pressure, the valve element 134 is easily kept closed. If the valve device 76—as previously described—is closed by means of the actuator 34 or by corresponding control of the actuator 34 and if the pumping operation is subsequently performed, a small pressure difference establishes on the output side for example between the pre-chamber 130 and the valve chamber 148 due to the throttle, but the valve element 134 remains closed due to the valve spring 136, in particular due to a spring force provided by the valve spring 136 and acting on the valve element 134. This can also be realized via different hydraulic cross-sections.

If the valve device 76 is opened by corresponding control of the actuator 34, the pressure in the valve chamber 148 faster decreases via the valve device 76 than in the channel part T2, in particular due to the fact that the throttle 138 is arranged in the bypass channel 140. As a result, the valve element 134 is opened or the servo valve 130 is shifted from the second closed state into the second open state. In contrast or in comparison to the valve device 76 in itself, the servo valve 130 or the valve element 134 can realize a considerably greater deflection such that fluids with high viscosity can particularly fast flow off, this means can be discharged from the output chamber 18.

The invention claimed is:

1. An actuator device, comprising:
   at least one output element, which can be supplied with a fluid and is thereby movable into at least one retaining position,
   an actuator, which is operable in a pumping operation by controlling the actuator, in which at least a part of the actuator is alternatingly movable in a first direction and in a second direction opposite to the first direction by controlling the actuator, whereby the fluid can be conveyed to the output element for supplying the output element with the fluid,
   at least one discharge channel, via which the fluid can be discharged from the output element,
   a valve device, which comprises two valve elements, which are movable in relation to each other, whereby the valve device is shiftable between at least one closed state blocking the discharge channel, in which the output element can be retained in the retaining position by the fluid while blocking the discharge channel, and at least one open state releasing the discharge channel, in which the valve elements allow discharge of the fluid from the output element via the discharge channel and thereby a movement of the output element from the retaining position into at least one evasive position, wherein:
   by moving the part of the actuator in the first direction, a first one of the valve elements is movable in a first actuation direction and thereby movable towards the second valve element, whereby the valve device is shiftable into the closed state,
   by moving the part in the second direction, a movement of the first valve element in a second actuation direction opposite to the first actuation direction away from the second valve element can be effected, whereby the valve device is shiftable into the open state,
   the actuator device is formed to alternatingly move the part of the actuator in the first direction and in the second direction in the pumping operation such that in the pumping operation, after shifting the valve device into the closed state, the valve device remains in the closed state despite the alternating movement of the part in the first direction and in the second direction occurring in the pumping operation, whereby the fluid is conveyable to the output element in the pumping operation, and
   the actuator device is operable in an opening operation different from the pumping operation and following the pumping operation, in which, in the opening operation, a movement of the part of the actuator occurring in the second direction results in a movement of the first valve element proceeding in the second actuation direction and away from the second valve element and thereby in shifting the valve device from the closed state into the open state.

2. The actuator device according to claim 1, further comprising:
   a damper device, which allows a movement of the first valve element in the first actuation direction towards the second valve element and thereby shifting the valve device from the open state into the closed state upon a movement of the part in the first direction provided for beginning the pumping operation, and prevents a movement of the first valve element in the second actuation direction away from the second valve element effecting a shift of the valve device into the open state, and thereby retains the valve device in the closed state upon a subsequent movement of the part in the second direction, whereby in the pumping operation, the part of the actuator is alternatingly movable in the first direction and in the second direction, while the valve device remains in the closed state.

3. The actuator device according to claim 2, wherein
   by the fact that the damper device, in the pumping operation, prevents a movement of the first valve element in the second actuation direction away from the second valve element effecting a shift of the valve device into the open state and thereby retains the valve device in the closed state, the part of the actuator and thereby the valve elements are alternatingly movable in the first actuation direction and in the second actuation direction, while the valve device remains in the closed state.

4. The actuator device according to claim 2, wherein
   the damper device is formed to allow a relative movement between the valve elements occurring along the first actuation direction and/or along the second actuation direction and effecting a shift of the valve device from the closed state into the open state in the opening operation.

5. The actuator device according to claim 2, further comprising:
   at least one stop, wherein the valve elements and the part of the actuator are movable along the first direction and along the second direction in relation to the stop.

6. The actuator device according to claim 2, wherein
   the damper device comprises a first damper element movable together with the first valve element and a second damper element movable in relation to the first damper element, wherein the damper elements are movable in relation to each other upon a movement of the first valve element in the first actuation direction towards the second valve element effected by moving the part in the first direction, provided for shifting the valve device from the open state into the closed state and for beginning the pumping operation.

7. The actuator device according to claim 5, wherein
   the damper elements are movable in the first direction and in the second direction in relation to the stop, wherein a movement of the second damper element in the second direction can be limited by the stop such that upon the movement of the first valve element in the first actuation direction towards the second valve element effected by moving the part in the first direction and provided for shifting the valve device from the open state into the closed state and for beginning the pumping operation, the first damper element is movable in the first direction in relation to the second damper element, while a movement of the second damper element in the first direction remains undone.

8. The actuator device according to claim 6, further comprising:
a return element, by which the damper elements are movable in relation to each other along the first direction and/or along the second direction, whereby a relative movement between the valve elements proceeding along the first actuation direction and/or the second actuation direction and effecting a shift of the valve device from the closed state into the open state can be effected by the return element.

9. The actuator device according to claim 8, wherein the return element is coupled to the first damper element on the one hand and to the second damper element on the other hand.

10. The actuator device according to claim 6, wherein the damper elements bound two damper chambers, in which a damping medium is respectively accommodated, which can be introduced into the damper chambers and can be passed out of the damper chambers.

11. The actuator device according to claim 10, wherein the damper medium is the fluid.

12. The actuator device according to claim 1, further comprising:
a drive element, which comprises a first drive part, a second drive part and at least one drive chamber bounded by the drive parts, wherein the first drive part is alternatingly movable in the first direction and in the second direction in relation to the second drive part by the part of the actuator, together with the second valve element, in the pumping operation, whereby the fluid is conveyable out of the drive chamber to the output element and conveyable into the drive chamber.

13. The actuator device according to claim 12, further comprising:
a check valve, via which the fluid can be introduced into the drive chamber.

14. The actuator device according to claim 12, further comprising:
a return device, by which the first drive part and the second valve element are movable in the second direction in relation to the second drive part.

15. A method for operating an actuator device, which comprises:
at least one output element, which can be supplied with a fluid and is thereby movable into at least one retaining position,
an actuator, which is controlled and thereby operated in a pumping operation, in which at least a part of the actuator is alternatingly moved in a first direction and in a second direction opposite to the first direction by controlling the actuator, whereby the fluid is conveyed to the output element for supplying the output element with the fluid, at least one discharge channel, via which the fluid can be discharged from the output element, a valve device, which comprises two valve elements, which are movable in relation to each other, whereby the valve device is shiftable between at least one closed state blocking the discharge channel, in which the output element can be retained in the retaining position by the fluid while blocking the discharge channel, and at least one open state releasing the discharge channel, in which the valve elements allow discharge of the fluid from the output element via the discharge channel and thereby a movement of the output element from the retaining position into at least one evasive position, the method comprising:

moving the part of the actuator in the first direction, a first one of the valve elements being movable in a first actuation direction and thereby movable towards the second valve element, whereby the valve device is shiftable into the closed state, moving the part in the second direction, by which a movement of the first valve element in a second actuation direction opposite to the first actuation direction away from the second valve element can be effected, whereby the valve device is shiftable into the open state, by the actuator device, alternatingly moving the part of the actuator in the first direction and in the second direction in the pumping operation such that in the pumping operation, after shifting the valve device into the closed state, the valve device remains in the closed state despite the alternating movement of the part in the first direction and in the second direction occurring in the pumping operation, whereby the fluid is conveyed to the output element in the pumping operation, and operating the actuator device in an opening operation different from the pumping operation and following the pumping operation, in which, in the opening operation, a movement of the part of the actuator occurring in the second direction results in a movement of the first valve element proceeding in the second actuation direction and away from the second valve element and thereby in shifting the valve device from the closed state into the open state.

* * * * *